United States Patent [19]

Krossa et al.

[11] 4,041,471
[45] Aug. 9, 1977

[54] DATA PROCESSING SYSTEM INCLUDING A PLURALITY OF PROGRAMMED MACHINES AND PARTICULARLY INCLUDING A SUPERVISOR MACHINE AND AN OBJECT MACHINE

[75] Inventors: Kenneth D. Krossa; Douglas B. Earl, both of Los Altos, Calif.

[73] Assignee: Scientific Micro Systems, Inc., Mountain View, Calif.

[21] Appl. No.: 567,717

[22] Filed: Apr. 14, 1975

[51] Int. Cl.² .............................................. G06F 15/16
[52] U.S. Cl. .................................................. 364/200
[58] Field of Search .................... 340/172.5; 445/1

[56] References Cited

U.S. PATENT DOCUMENTS

| | | | |
|---|---|---|---|
| 3,252,149 | 5/1966 | Weida et al. | 340/172.5 |
| 3,287,705 | 11/1966 | Rosenblatt | 340/172.5 |
| 3,374,465 | 3/1968 | Richmond et al. | 340/172.5 |
| 3,560,934 | 2/1971 | Ernst et al. | 340/172.5 |
| 3,566,357 | 2/1971 | Ling | 340/172.5 |
| 3,602,900 | 8/1971 | Delaigue et al. | 340/172.5 |
| 3,611,300 | 10/1971 | Aldrich et al. | 340/172.5 |
| 3,634,830 | 1/1972 | Baskin | 340/172.5 |
| 3,678,467 | 7/1972 | Nussbaum et al. | 340/172.5 |
| 3,739,352 | 6/1973 | Packard | 340/172.5 |
| 3,753,234 | 8/1973 | Gilbert et al. | 340/172.5 |
| 3,864,670 | 2/1975 | Inoue et al. | 340/172.5 |
| 3,889,237 | 6/1975 | Alferness et al. | 340/172.5 |

*Primary Examiner*—Melvin B. Chapnick
*Attorney, Agent, or Firm*—Flehr, Hohbach, Test, Albritton & Herbert

[57] ABSTRACT

A data processing system in which a programmed supervisor data processing machine and a programmed object data processing machine are interconnected. The object machine is typically a controller which receives input signals from and delivers output signals to interface vector buffer stores under control of an object machine program. The buffer stores connect to and from user devices. The supervisor machine operates to execute a supervisor machine program. The supervisor machine halts and starts the object machine, causes supervisor instructions to be executed in the object machine, extracts information from the object machine and restores the object machine to its prehalt status allowing the object machine to continue processing the object machine program.

17 Claims, 7 Drawing Figures

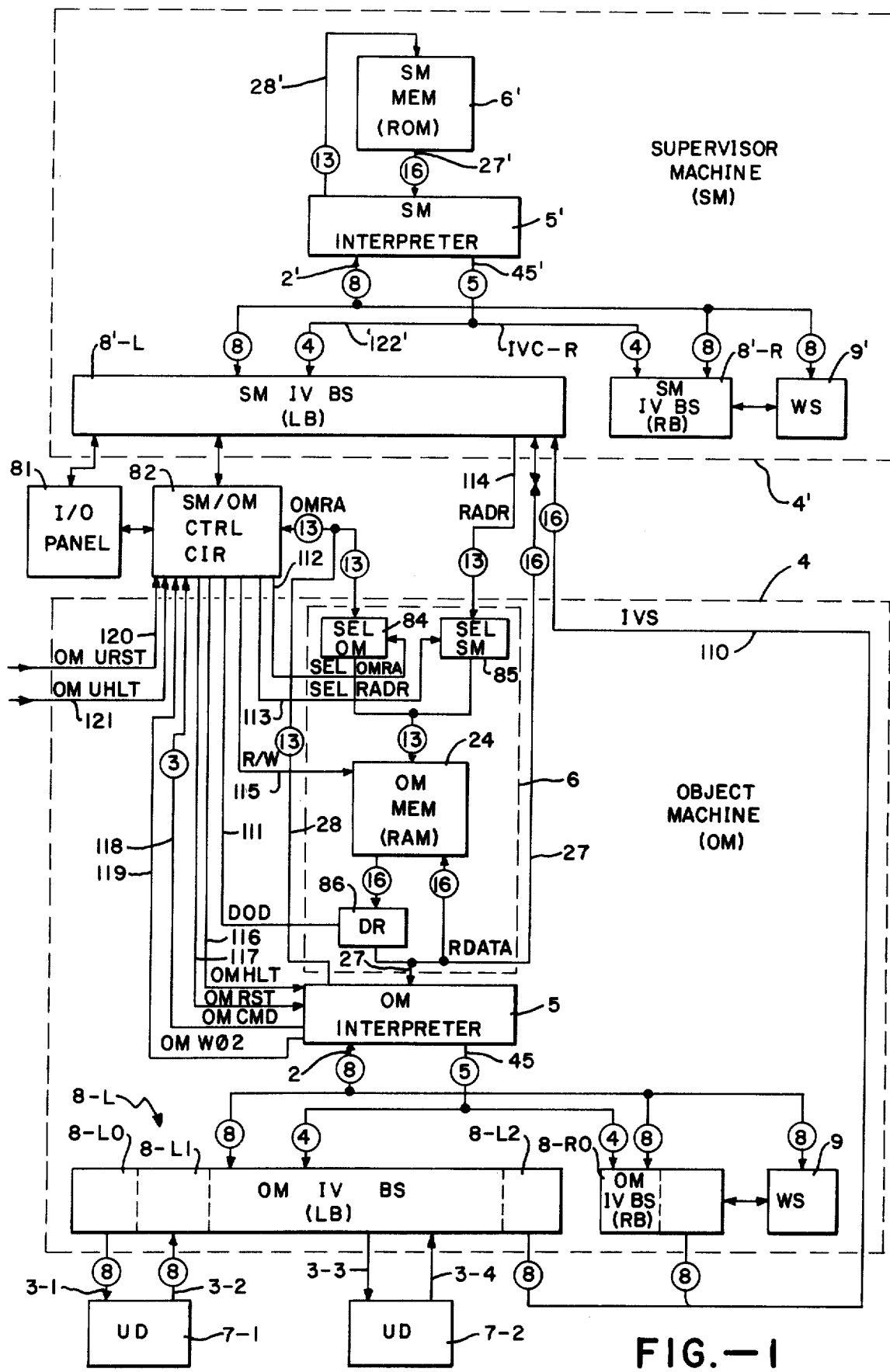
FIG.—1

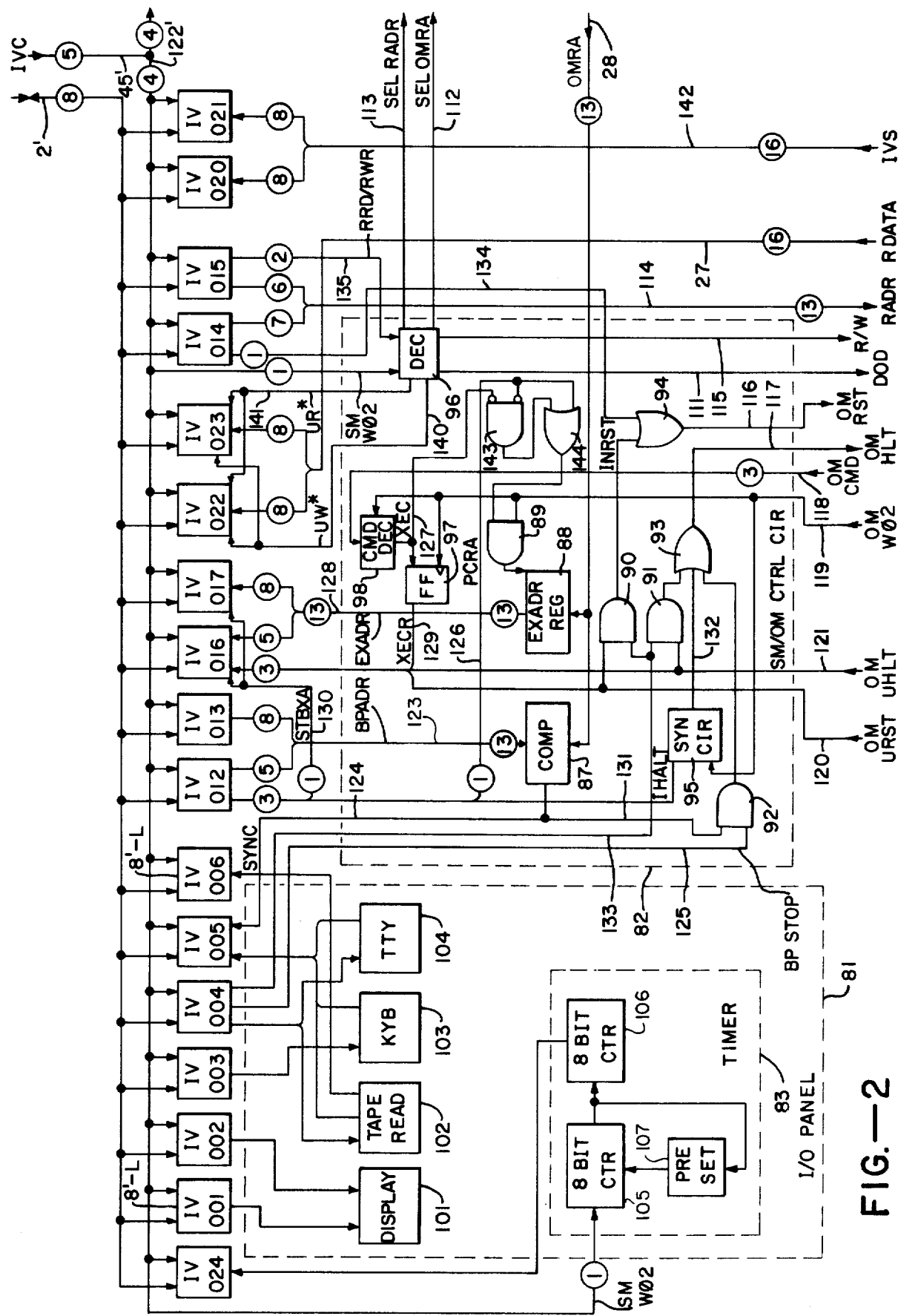
FIG.—2

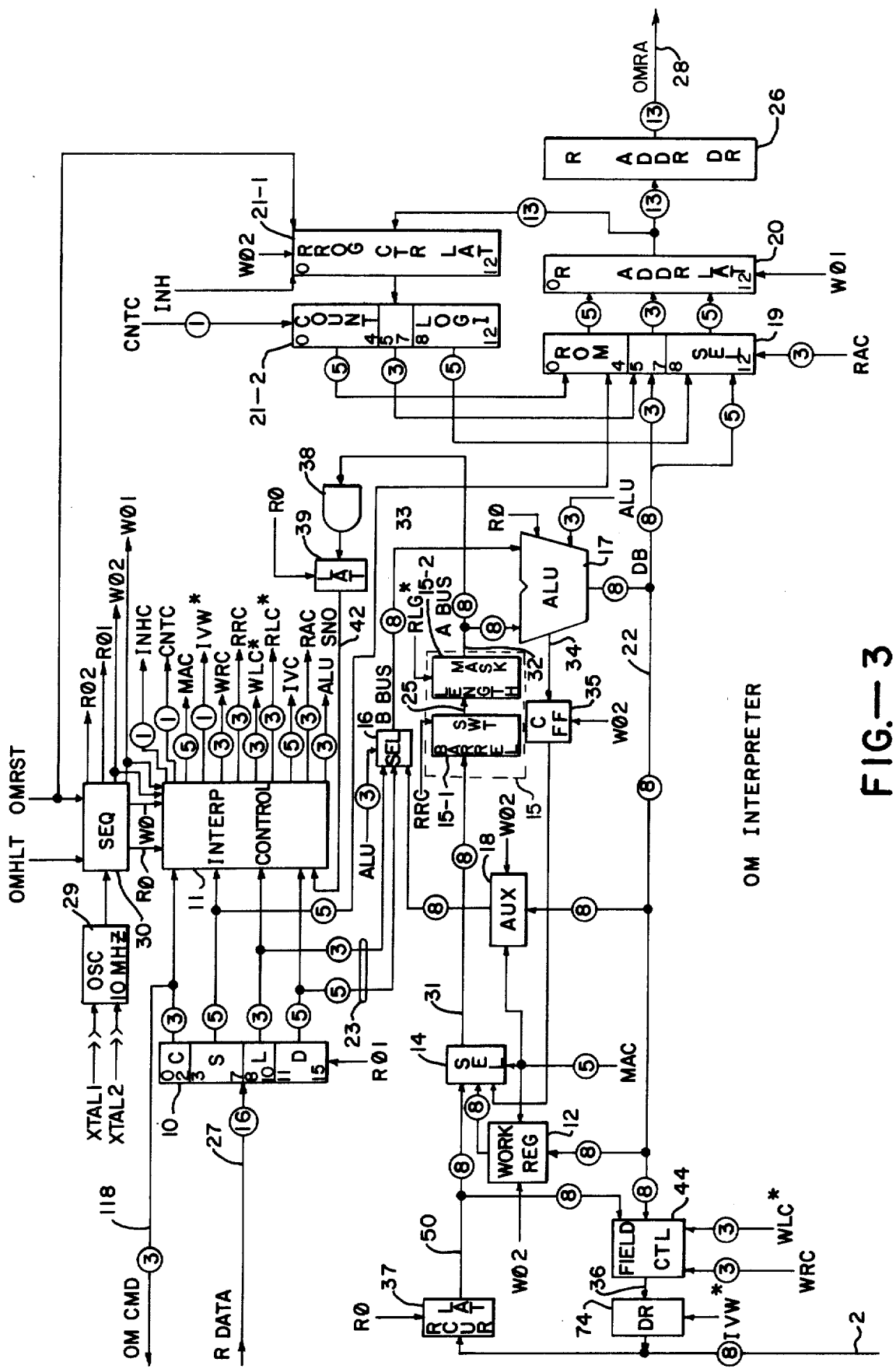
FIG.—3

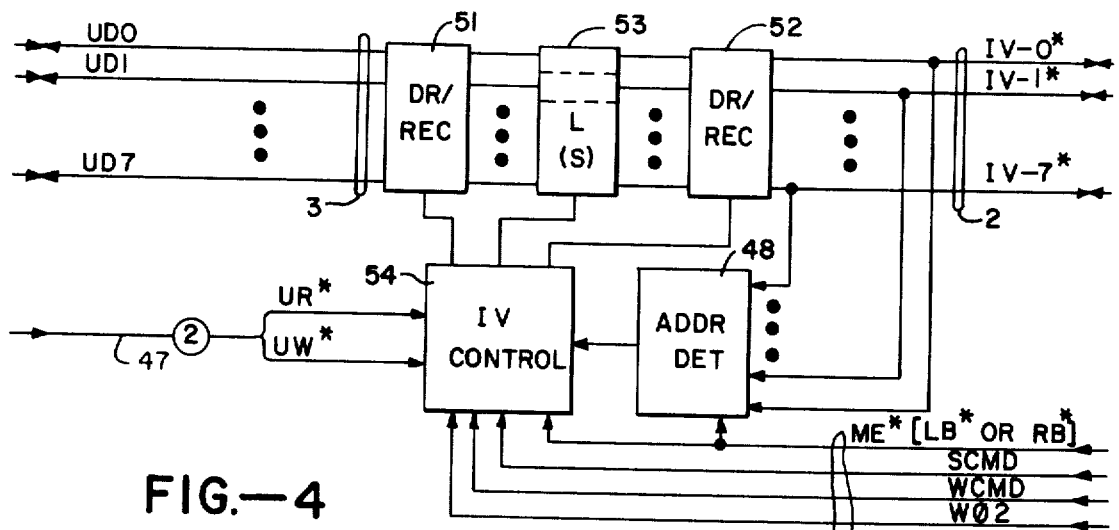
FIG.—4
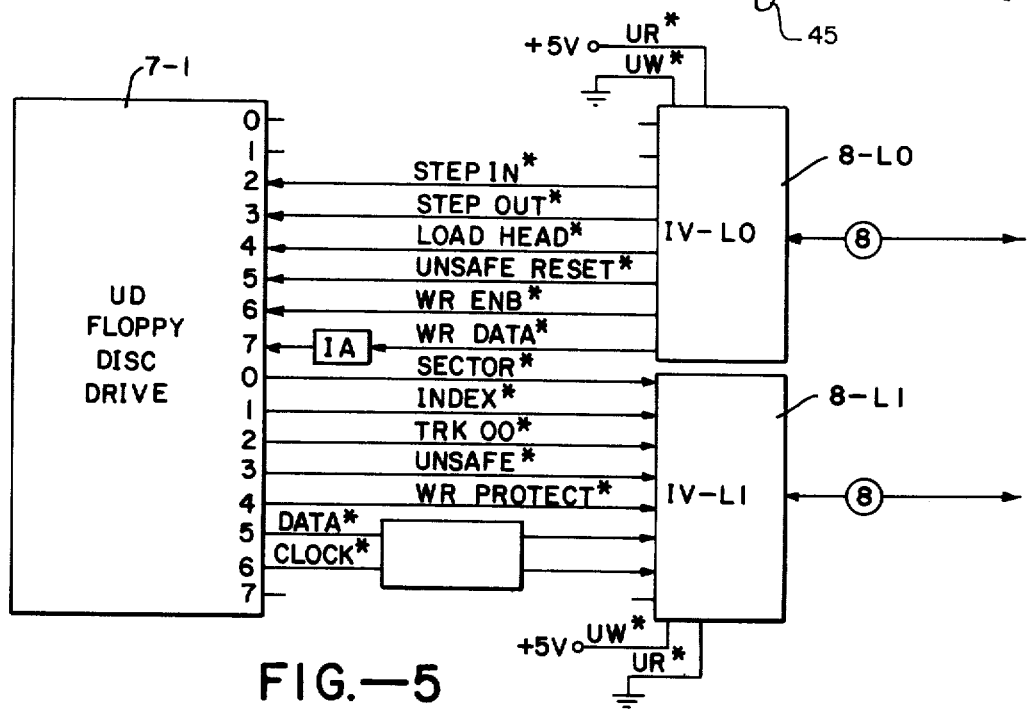
FIG.—5
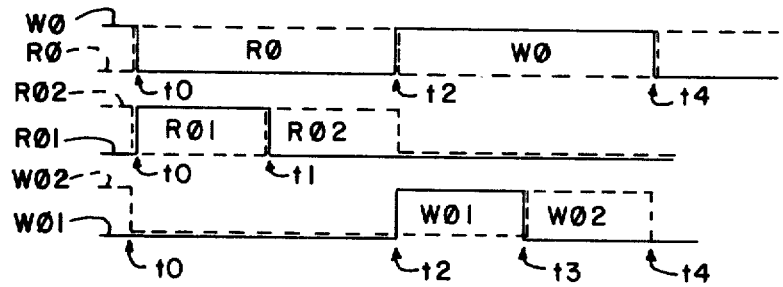
FIG.—6

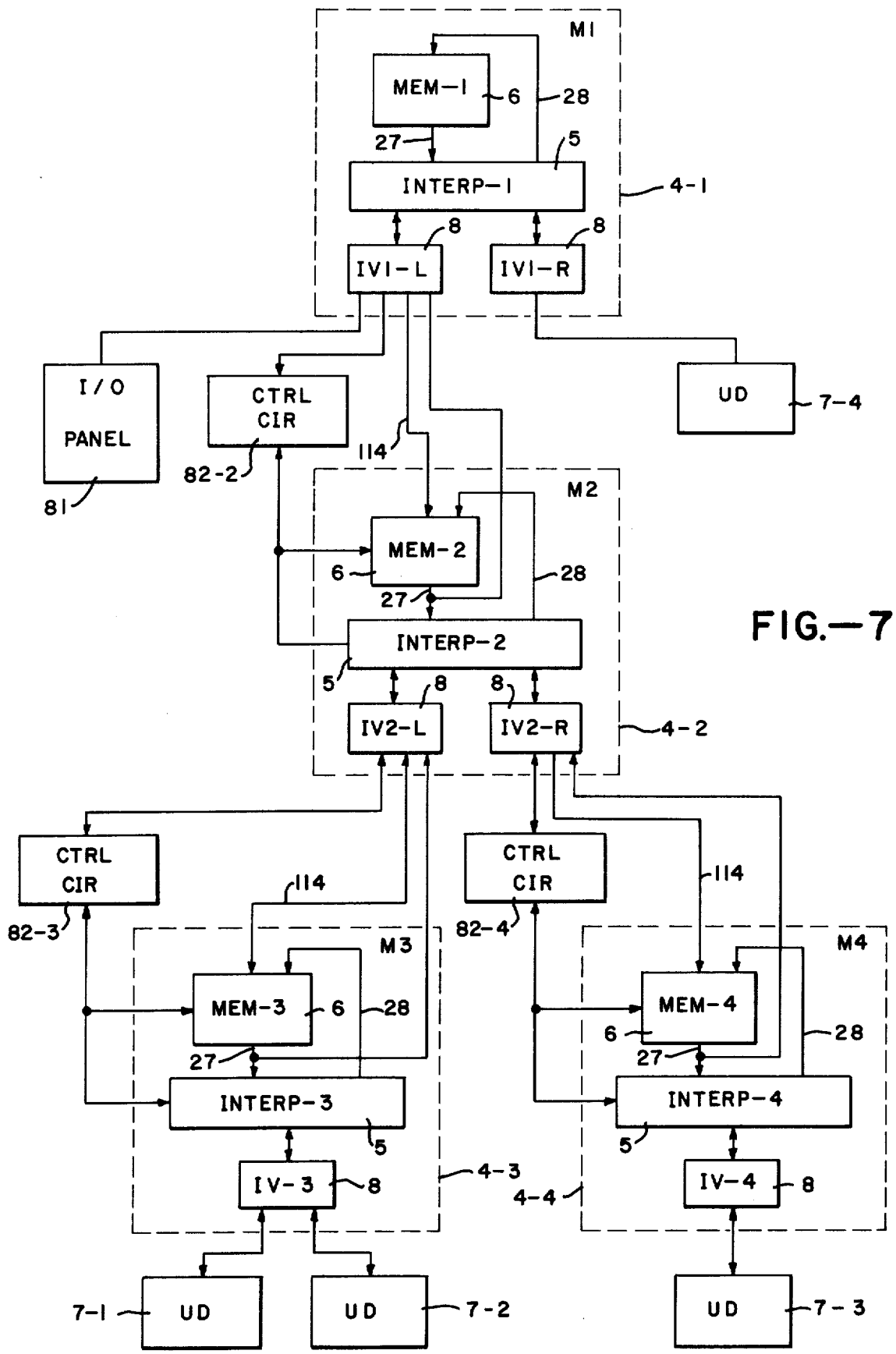
FIG.—7

DATA PROCESSING SYSTEM INCLUDING A PLURALITY OF PROGRAMMED MACHINES AND PARTICULARLY INCLUDING A SUPERVISOR MACHINE AND AN OBJECT MACHINE

CROSS-REFERENCE TO RELATED APPLICATIONS

CONTROLLER FOR DIGITAL DEVICES invented by Glenn A. Oliver, Ken D. Krossa and Douglas B. Earl, Ser. No. 490,854, filed July 22, 1974 and assigned to Scientific Micro Systems, Inc. now U.S. Pat. No. 3,931,615.

BACKGROUND OF THE INVENTION

The present invention relates to data processing systems and particularly to systems having two or more programmed data processing machines which are interconnected.

The architectures of data processing systems are in part controlled by the technology utilized to build the circuits. New simiconductor technologies have allowed larger and larger parts of systems to be integrated into smaller and smaller packages. Modular systems, distributed-function systems, and other types of a new systems are becoming common. One example of a new system is described in the above cross-referenced application entitled CONTROLLER FOR DIGITAL DEVICES where a programmable data processing machine functions as a controller for an input/output user device.

Controllers in general connect over input/output interfaces to one or more controlled input/output devices. The controllers function to produce output signals to the devices which are a function, in part, of input signals from the devices. The controllers desirably produce the output signals, after receiving input signals, in as short a time as possible. The number of and logical states of input and output signals to and from controllers vary widely for different controlled devices. For example, a controller for controlling a magnetic disc unit requires different signals than a controller for controlling a Teletype terminal. The controller in the above cross-referenced application can be utilized with many different types of controlled devices merely by changing the program within the controller.

When data processing machines, such as the programmed controller in the cross-referenced application are to be tested or utilized with other machines, the machines must be connected together. A need exists, therefore, for improved methods and apparatus to interconnect one data processing machine, having one stored program of instruction, with other data processing machines having other stored programs of instructions.

In accordance with the above background, an object of the present invention is to provide an improved data processing system in which two or more programmed data processing machines are interconnected.

OBJECTS AND SUMMARY OF THE INVENTION

The present invention is a data processing system in which a plurality of data processing machines each having its own program, are interconnected. One machine, called an object machine, is programmed to execute an object program. Another machine, called a supervisor machine, is programmed to execute a supervisor program. Means are provided for interconnecting the supervisor machine to the object machine whereby the supervisor machine can interrupt operation of the object machine and cause the object machine to execute instructions provided by the supervisor machine. Further means are provided for storing the status of the object machine at the time the object machine is interrupted by the supervisor machine and for returning the object machine to that status after interruption by the supervisor machine.

In a preferred embodiment of the invention, the object machine is a controller for controlling digital devices such as conventional input/output devices utilized in data processing system. The object machine, as a controller, stores input and output signals (operands) an interface vector buffer stores. The buffer stores are accessible for reading and writing by the controlled digital devices. The buffer stores are also accessible for reading and writing by a program-controlled interpreter within the object machine. The interpreter functions to execute instructions stored in an object machine memory and in so doing dynamically controls the digital devices. The interpreter includes apparatus and an instruction set in which the buffer stores are specified as a source of and/or the destination of variable length operands utilized in the execution of instructions. Instruction accessing and operand accessing within the object machine are carried out, in one preferred embodiment, with separate apparatus.

In accordance with another preferred embodiment of the invention, the supervisor machine is substantially identical to the object machine. The supervisor machine includes a supervisor memory for storing the supervisor program, a supervisor interpreter for executing supervisor instructions and supervisor interface vector buffer stores for storing operands. The supervisor buffer stores store operands which function as inputs and outputs to an input/output panel and to a control circuit which controls the mode of the object machine.

In one preferred embodiment, the supervisor machine memory is a read only memory addressable by the supervisor interpreter for accessing instructions.

In another preferred embodiment, the object machine memory is a random access memory which is addressable either by the supervisor machine or by the object machine. Also, the object machine memory is controllable for storing data from the supervisor machine or for reading out data either to the object machine interpreter or to the supervisor machine. The addressing and accessing of the object machine memory is under the control of the control circuit.

In accordance with a further embodiment of the invention, the buffer stores in both the object machine and the supervisor machine are organized with a first plurality of buffer stores organized into a first bank (left bank) and a second plurality of buffer stores organized into a second bank (right bank). In each machine, the buffer stores in one bank are addressed in common under control of the interpreter and the buffer stores in the other bank are also addressed in common by the interpreter. In each machine, operation can occur such that a buffer store in one bank serves as a operand source while a buffer store in the other bank serves as an operand destination during the execution of one instruction.

In accordance with another embodiment of the invention, a paged working store is connected through buffer stores in one bank to one of the respective machines.

In accordance with one preferred configuration and method of operation of the present invention, the object machine is programmed to function as a controller for digital devices where the digital devices are connected to the buffer stores of the object machine. The supervisor machine is programmed to monitor and control the object machine. The supervisor machine, through supervisor buffer stores, interrogates and controls the object machine and extracts information from the object machine about how the object machine is performing in its role as a controller. The supervisor machine halts and starts the object machine, causes supervisor instructions to be executed in the object machine, extracts information from the object machine and restores the object machine to its prehalt status allowing the object machine to continue processing the object machine program.

In accordance with the above summary, the present invention achieves the objective of providing an improved method and apparatus comprising a data processing system which includes the interconnection of two or more separately programmed data processing machines.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 1 depicts an overall block diagram of a data processing system including a program-controlled object machine connected as a controller for digital user devices and a program-controlled supervisor machine interconnected to the object machine through buffer stores associated with the supervisor machine.

FIG. 2 depicts a block diagram of the interface between the supervisor machine buffer stores, the input/output panel and the supervisor machine/object machine control circuitry.

FIG. 3 depicts a block diagram of the object machine interpreter which functions to execute object machine instructions.

FIG. 4 depicts a block diagram of one interface vector (IV) buffer store representative of those utilized in FIGS. 1 and 2.

FIG. 5 depicts a schematic representation of the interface connections between buffer stores of the FIG. 4 type and a digital user device in the form of a floppy disc drive.

FIG. 6 depicts timing waveforms representative of the operation of the present invention.

FIG. 7 depicts an overall block diagram of a data processing system in which four separately programmed data processing machines are interconnected.

DESCRIPTION OF THE PREFERRED EMBODIMENTS

In FIG. 1, the data processing system includes an object machine 4 which interconnects with digital user devices 7-1 and 7-2. The system includes a supervisor machine 4' which interconnects to an input/output (I/O) panel 81 and to a supervisor machine/object machine control circuit (SM/OM CTRL CIR) 82. The object machine 4 and the supervisor machine 4' are each program-controlled and function to execute their own stored programs. The supervisor machine executes a supervisor program and the object machine executes an object program. In one particular embodiment, the object machine and the object program function as a controller for controlling the user devices 7. The supervisor machine and the supervisor program function to monitor and control the operation of the object machine 4 and the user device 7.

In FIG. 1, the object machine 4 connects to the digital user devices 7-1 and 7-2 over user device (UD) data buses 3-1 through 3-4. The user buses 3-1 through 3-4 connect to the interface vector buffer stores (OM IV BS) 8 including the stores 8-L0, 8-S1, 8-L2, and 8-RO. The buffer stores 8 define control points for the user devices 7. The buffer stores 8 receive signals from and transmit signals to the user devices 7. The logical state of the control points defined by the signals from and to the buffer stores is a function of a stored program of instructions within the object machine 4. The object machine program is stored in the object machine memory (OM MEM) 6 which for the system of FIG. 1, preferably includes a random access memory (RAM) 24. Instructions stored in the memory 6, together with information received from the user devices and stored in the buffer stores 8, are processed in the object machine (OM) interpreter 5.

The buffer stores 8 are divided into a left bank 8-L and a right bank 8-R. The left bank buffer stores 8-L include at least the buffer stores 8-L0, 8-L1 and 8-L2. Similarly the right bank buffer stores 8-R include at least the buffer store 8-RO.

The buffer stores 8 are connected to the interpreter 5 over an 8-bit IV bus 2 which connects in parallel to each of the buffer stores, particularly, to the buffer stores 8-L0, 8-L1, 8-L2 and 8-RO. In addition to the 8-bit IV bus 2, the object machine interpreter 5 has a 5-bit control bus (IVC) 45. Three of the bus 45 control lines (SCMD, WCMD, W$\phi$2) are common to both the left bank buffer stores 8-L and the right bank buffer stores 8-R. Two additional lines RB* and LB*, connect to the right bank and left bank buffer stores, respectively. A total of four of the five IVC lines 45 connect to the respective left and right bank buffer stores.

Operands are transferred between an active one of the object machine buffer stores 8 and the object machine interpreter 5 over the IV bus 2 under control of signals on the IVC bus 45. The left bank buffer stores 8-L are responsible for communicating information from and to the user devices 7. The right bank buffer stores 8-R are available for communicating information from and to a working store 9. The identity of which particular one of the object machine buffer stores is active at any given time is stored for the left bank in the buffer store 8-L2 and for the right bank in the buffer store 8-RO. The identity of which object machine left bank buffer store is active and which right bank buffer store is active is transmitted to the left bank 8'-L of the supervisor machine buffer stores over the 16-bit IVS bus 110 (8 bits for each bank).

The object machine interpreter 5 receives instructions to be processed from the 16-bit RDATA bus 27. The bus 27 on addition to being input to the object machine interpreter 5 is also connected as an input to the object machine memory 24 and as an input and an output from the buffer stores 8'-L of the supervisor machine 4'. The bus 27, while being able to receive data from the supervisor machine buffer stores also receives data from the object machine memory 24 through the driver circuits 86. The driver circuits 86 control placement of the data on the bus 27 by the data out disable (DOD) line 111.

The object machine interpreter 5 provides addresses for addressing the object machine memory 24 on the 13-bit address (OMRA) bus 28. Bus 28 is input to the control circuitry 82 and is selectable through selection gates (SELOM) 84 for input to the memory 24. Gates 84 are enabled by operation of the SELOMRA control line 112. The object machine memory 24 can be addressed by the 13-bit RADR bus 114 from the supervisor machine 4'. The RADR bus 114 is selected for input to the object machine memory 6 by the selection gates (SELSM) 85. Gates 85 are enabled by operation of the SELRADR line 113 from the control circuit 82. The determination of whether the object machine memory 24 is addressed for reading or writing is controlled by the R/W line 115 from the control circuit 82.

The control circuit 82 additionally interconnects with the object machine interpreter 5 with an object machine halt (OMHALT) line 116. The line 116, when energized by control circuit 82, allows the interpreter 5 to complete processing of its current instruction cycle and to stop processing at the beginning of the next instruction cycle. The object machine reset (OMRST) line 117 connects from control circuit 82 to interpreter 5. When the line 117 signal is enabled, the object machine interpreter 5 is immediately reset to the beginning of an instruction cycle with a predetermined instruction address (typically address 0). The 3-bit object machine command (OMCMD) line 118 connects from the object machine interpreter to the control circuit 82. The line 118 specifies which instruction is currently being executed by the object machine interpreter 5. The object machine clock line (OMWφ2) 119 connects from the object interpreter 5 to the control circuit 82 for providing the object machine timing to circuit 82.

Control circuit 82 also receives an object machine user reset (OMURST) line 120 and an object machine user halt (OMUHLT) line 121. These lines 120 and 121 are available to a user of the FIG. 1, data processing system for either resetting or halting the object machine as described in connection with the line 116 and 117 signals. Lines 120 and 121 typically connect to switches (not shown) either of the manual or automatic type.

The control circuit 82 also interconnects with the I/O panel 81 and the buffer stores 8'-L of the supervisor machine 4'. The details of the interconnections between the control circuit 82, the I/O panel 81, the object machine 4 and the supervisor machine 4' are described hereinafter in connection with FIG. 2.

In FIG. 1, the supervisor machine (SM) is substantially identical in structure to the object machine 4. The supervisor machine 4' includes a supervisor memory 6' which is typically a read only memory (ROM). A supervisor interpreter 5' provides a 13-bit address on bus 28' for addressing the supervisor memory 6'. An instruction addressed in memory 6' appears on the 16-bit instruction bus 27' which is input to the interpreter 5'.

The supervisor machine interpreter 5' communicates with the supervisor machine interface vector buffer stores (SMIVBS) 8' over the 8-bit IV bus 2' under control of control signals on the 5-bit IVC bus 45'. The buffer stores 8' include the left bank buffer stores 8'-L and the right bank buffer stores 8'-R. The left bank buffer stores 8'-L interconnect with the object machine 4, the control circuit 82 and the I/O panel 81 as previously described. The right bank buffer stores 8'-R connect to a working store 9'. Of course, the right bank or left bank buffer stores can also include connections to additional devices.

In FIG. 2, a plurality of left bank buffer stores 8'-L are depicted. In particular, 17 left bank buffer stores are shown having the octal address 001 through 006, 012 through 017, and 020 through 024. Each of the buffer stores 8'-L in FIG. 2 receives the 8-bit IV bus 2' from the supervisor machine interpreter 5' of FIG. 1. Similarly, each of the left bank buffer stores receives the 4-bit IVC-L control bus 122' derived from the 5-bit IVC bus 45'. Data is transferred into or out from one of the 17 buffer stores 8'-L of FIG. 2 one at a time over the IV bus 2' under control of the IVC bus 45'. Data is transferred between the buffer stores 8'-L and the I/O panel 81, the supervisor machine/object machine control circuit 82 or directly to the object machine 4 of FIG. 1.

In FIG. 2, the I/O panel 81 includes a display device 101, a tape reader 102, a keyboard (KYB) 103 and a Teletype (TTY) 104 and a timer 83. The display 101 is a standard self-scan panel display which is, for example, Burroughs Model SSDO132-0030. The tape reader 102 is a standard device such as that manufactured by Addmaster Corporation Model 601. The keyboard 103 is a standard keyboard device such as that manufactured by Keytronic Corporation. The Teletype 104 is any standard telegraphic device.

In FIG. 2, the timer 83 within the I/O panel 81 includes an 8-bit binary counter 105 which counts the supervisor machine clock pulses on the line SMWφ2. When counter 105 reaches a count of 256 a carry-out is input to the 8-bit binary counter 106 and is also input to the preset circuit 107. Preset circuit 107 causes a count of 137 to be parallel loaded into counter 105. Thereafter, counter 105 continues counting for 119 machine cycles (SMWφ2 clock cycles) until the next carry-out occurs, a period of approximately 35.7 microseconds. The counts in 8-bit counter 106 are input to the buffer store 024 of the supervisor machine and are addressable by the supervisor machine for timing functions in connection with other units in the I/O panel.

The buffer stores 8'-L having octal addresses 001 through 006 and 024 connect to the various units in the I/O panel 81 in the manner indicated in FIG. 2. A more detailed interconnection specification is described for all left bank buffer stores in the following CHART I.

In FIG. 2, the supervisor machine/object machine control circuit (SM/OM CTRL CIR) 82 interconnects with buffer stores having octal addresses 012 through 017 in the manner indicated in FIG. 2. The actual field definitions are shown in CHART I.

In FIG. 2, the control circuit 82 includes a 13-bit comparator 87. Comparator 87 is any conventional device which functions to compare the 13-bit breakpoint address (BPADR) on bus 123 with the object machine memory address (OMRA) on 13-bit bus 28. The OMRA address is output on bus 28 from the object machine interpreter 5 in FIG. 1 and the BPADR address is output on bus 123 from the supervisor machine buffer stores 012 and 013. When the two addresses (BPADR and OMRA) compare, comparator 87 provides an output signal SYNC on line 124. The SYNC signal on line 124 is input to the buffer store 005 and to the AND gate 92. Gate 92 also receives the breakpoint stop (BPSTOP) signal on line 125 from the buffer store 004. Whenever the BPSTOP signal is enabled with a 1, gate 92 will pass any SYNC signal 1 to the OR gate 93 and will cause the object machine halt (OMHLT) signal on line 117 to halt the object machine 4 of FIG. 1.

zero. I HALT = 0, RUN (If OMURST = 0 and OMUHLT = 0) I HALT = 1, HALT

CHART I

| IV BS | DIRECTION | FIELD FORMAT | | | | | | | |
|-------|-----------|---|---|---|---|---|---|---|---|
|       |           | 0 | 1 | 2 | 3 | 4 | 5 | 6 | 7 |
| 001H | OUT | DCLK | DRST | | | DCHAR(0-5) | | | |
| 002H | OUT | D250V | | | | DAUX(0-6) | | | |
| 003H | OUT | | | | | KBOUT(0-5) | | | |
| 004H | OUT | TTOUT | RHOVR | BPSTOP | LEDS | | MOTOR(0-3) | | |
| 005H | IN | TTIN | SYNC | | SPRKT | | KBIN(0-3) | | |
| 006H | IN | | | | TCHAR(0-7) | | | | |
| 012H | OUT | IHALT | PCRA | STBXA | | | BPADR(0-4) | | |
| 013H | OUT | | | | | BPADR(5-12) | | | |
| 014H | OUT | INRST | | | | RADR(0-6) | | | |
| 015H | OUT | | | | RADR(7-12) | | | RRD | RWR |
| 016H | IN | UHLT | URST | XECR | | | EXADR(0-4) | | |
| 017H | IN | | | | | EXADR(5-12) | | | |
| 020H | IN | | | | | LIVS | | | |
| 021H | IN | | | | | RIVS | | | |
| 022H | IN/OUT | | | | | RDATA(0-7) | | | |
| 023H | IN/OUT | | | | | RDATA(8-15) | | | |
| 024H | IN | | | | | TIMER | | | |

In CHART I, the fields for the display 101 are as follows:
  DCLK: clock signal, 0 or 1 for 35.7 microseconds
  DRST: reset display scan.
    0 = RESET
    1 = NORMAL SCAN
  DCHAR 0-5: 6-bit character code.
  D250V: display power
    0 = ON
    1 = OFF
  DAUX 0-6: auxiliary data inputs which by-pass character generator In CHART I, the fields for the keyboard 103 are as follows:
  KBOUT 0-5: six strobe lines to the keyboard (3 or 4 keys per line). KBOUTi = 0, STROBE LINE i; if a key on line i is depressed the corresponding KBINj line is set to zero.
  KBIN 0-3: four data lines from the keyboard (5 or 6 keys per line). KBINj = 0, a key on data line j is depressed while strobe line to that key is set to zero.

In CHART I, the fields for the tape reader 102 are as follows:
  LEDS: light emitting diode control,
    0 = LEDS OFF
    1 = LEDS ON
  MOTOR 0-3: 4-phase motor control
  SPRKT: Value of the sprocket position on tape; SPRKT = 1, When the sprocket hole appears. The sprocket hole is located between BIT 3 and BIT 4 (TCHAR 4 and TCHAR 5).
  TCHAR 0-7: Tape data character
    TCHAR = 1, When a hole exists in channel.
    TCHAR 0 = BIT 8, WIDE SIDE, MSB.
    TCHAR 7 = BIT 1, NARROW SIDE, LSB.

In CHART I, the fields for the Teletype 104 are as follows:
  TTOUT: Output bit from panel machine to Teletype. This bit should be 1 in inactive condition.
  TTIN: Input bit from Teletype to panel machine. This bit is 1 in inactive state.

In CHART I, the field definitions for the object machine 4 are as follows:
  IHALT: RUN/HALT control exercised by supervisor machine; Object machine runs only when OMUHLT (below), and OMURST (below) are all zero. I HALT = 0, RUN (If OMURST = 0 and OMUHLT = 0) I HALT = 1, HALT
  PCRA: PC (program counter) or OMRA selection for EXADR 0-12. PCRA = 0, EXADR will receive PC when execution address strobed (STBXA) provided OMRA is not in range of execute (XEC = 0).
  PCRA = 1, EXADR will receive OMRA when execution address strobed, irrespective of execute range (XEC = 0 or XEC = 1); used only during halt.
  STBXA: Strobe execution address into EXADR.
    STBXA = 0, No strobe, EXADR unchanged
    STBXA = 1, Strobe as long as set. (until STBXA = 0).
  BPADR 1-12: Breakpoint address, address against which OMRA execution address compared; at comparison, a SYNC signal is generated, but no direct effect made on object machine.
  OMUHLT: User halt line from external controls (not shown); this line is combined with IHALT (above) from supervisor machine to control object machine.
    OMUHLT = 0, RUN (If IHALT = 0 and OMURST = 0) OMUHLT = 1, HALT
  OMURST: User reset line from external controls (not shown); this line is the only reset line to the object machine.
    OMURST = 0, Object machine may run if both IHALT and OMUHLT are zero.
    OMURST = 1, Reset object machine, force OMRA to zero and halt machine.
  XECR: IN - RANGE - OF - EXECUTE INDICATOR
    XECR = 0, Not in range of XEC instruction
    XECR = 1, Current instruction addressed by an XEC instruction, PC and OMRA may not match.
  RHOVR = 1, The OMURST and OMUHLT lines are prevented from affecting the object machine.
  RHOVR = 0, OMURST and OMUHLT lines can control the object machine.
  BPSTOP: Breakpoint stop control exercised by the supervisor machine.
    BPSTOP = 1, The object machine will halt when the object machine memory address (OMRA) matches the breakpoint address (BPADR).

BPSTOP = 0, The object machine runs and does not stop when a compare of the BPADR and OMRA lines occurs.

SYNC: A status bit indicating a match between the BPADR and the OMRA addresses. The SYNC bit will be 1 for the full object machine cycles of the match.

INRST: Object machine reset control exercised by the supervisor machine.
INRST = 1, Reset the OM interpreter; force OMRA to zero and halt.

EXADR 0-12: Strobed execution address; receives PC when PCRA = $\phi$ or OMRA when PCRA = 1.

LIVS: LEFT IV SELECT; Address of last IV BYTE selected on left bank of object machine.

RIVS: RIGHT IV SELECT: Address of last IV BYTE selected on right bank of object machine.

In CHART I, the field definition for the object machine RAM memory 24 are as follows:
RADR 0-12: RAM address for supervisor machine READ or WRITE.
RDATA 0-15: RAM data to or from the supervisor machine.
RRD: Panel machine read command bit to RAM.
RWR: Panel machine write command bit to RAM.

In FIG. 2, the control circuit 82 includes an external address register (EXADRREG) 88 which functions to store the 13-bit object machine memory OMRA on the bus 28 whenever the AND gate 89 is satisfied. Gate 89 is satisfied with a 1 from OR gate 144 when clocked by the object machine clock signal (OMW$\phi$2) on line 119. Gate 144 receives an input from PCRA line 126 (from the buffer store 012) and from the output of NAND gate 143. Gate 143 receives inputs from the XEC line 127 of the command decoder (CMDDEC) 98 and from the PCRA line. Whenever XEC line 127 and PCRA line 126 input to NAND gate 143 are both 0's, gate 143 provides a 1 which is propogated through OR gate 144 to gate 89. Whenever PCRA is 1, OR gate 144 also propogates a 1 to gate 89.

In FIG. 2, the command decoder 98 is a conventional device for decoding the 3-bit object machine command (OMCMD) on bus 118 (derived from register 10 in FIG. 3) to determine when the XEC command is present. Whenever the XEC command is present on bus 118, signifying that the object machine is executing an XEC instruction, at a time when the object machine clock signal OMW$\phi$2 is present on line 119, the decoder 98 provides the XEC signal on line 127 as a 1. That 1 is input to the gate 89, as previously described, and is input to the flip-flop 97. Each clock pulse on line 119 clocks the flip-flop 97 to store the 1 or 0 level of the XEC line 127 and responsively provide the XECR output from flip-flop 97 on line 129. The XECR signal on line 129 is in turn input to the buffer store 016 along with the object machine user halt signal (OMUHLT) on line 121 and the object machine reset signal (OMRST) on line 120.

In FIG. 2, the loading of the signals from lines 120, 121 and 129 and the loading of the EXADR address from bus 128 into the buffer stores 016 and 017 occurs only when the STBXA line 130 from the buffer store 012 is a logical 1. If the STBXA line is a 0, the contents of buffer stores 016 and 017 are not changed. As described in connection with FIG. 4 hereinafter, the STBXA line 130 is inverted and connects to the user write (UW*) line (identified in FIG. 4) for each of the buffer stores 016 and 017 in order to control the writing into the buffer stores.

The buffer store 012 also provides the IHALT signal output on line 131 which in turn is an input to the synchronization circuit (SYNCIR) 95. Circuit 95 also receives the object machine clock signal OMW$\phi$2 on line 119. Circuit 95 is any conventional synchronization circuit which provides on its output line 132 a signal having the duration of the input IHALT signal but with a time commencing in synchronization with the line 119 clock signal. A command to halt the operation of the object machine on line 131, as initiated by the supervisor machine 4' of FIG. 1, is generated in synchronism with the object machine clock on line 119. In this manner, the object machine is allowed to complete without interruption an instruction in progress in the object machine, at the time of the IHALT signal. The supervisor machine 4' and the object machine 4 of FIG. 1 operate asynchronously each having its own independently-timed clock. When the two machines are to interact, as occurs when the supervisor machine commands an IHALT signal, circuit 95 insures that the halt command does not interrupt the object machine in mid cycle. When the halt signal causes line 132 to be 1, OR gate 93 causes a 1 for the OMHLT line 117 which holds the object machine halted. If the IHALT line is 0 for one supervisor machine cycle, then the object machine is permitted to operate for one object machine cycle and, therefore, single step operation of the object machine can be controlled by the supervisor machine.

In FIG. 2, the object machine halt signal (OMHLT) is also generated through OR gate 93 whenever the AND gate 91 is satisfied. Gate 91 is satisfied whenever a user halt signal (OMUHALT) on line 121 is a 1 provided that gate 91 is enabled by a 1 on the override signal (RHOVR*) on line 133. Line 133 is input to AND gate 91 and also to AND gate 90. Gate 90 connects the object machine user reset signal (OMURST) to the OR gate 94. Gates 90 and 91 are enabled to make their connections whenever the RHOVR* signal is a 1 and inhibit those connections whenever that signal is a 0. The RHOVR* signal is an override signal, controlled by the supervisor machine 4' of FIG. 1, which prevents the object machine from being halted or reset by the lines 120 and 121.

In FIG. 2, the object machine can be reset also by the INRST signal on line 134 which is output from the buffer store 014. Accordingly, the object machine can be halted by direct command of the supervisor machine through buffer store 014.

In FIG. 2, the RRD and RWR lines 135 are connected from the buffer store 015 to a 2-bit decoder 96. Decoder 96 provides control signals which control the addressing and accessing of data from and to the object machine memory 24 of FIG. 1. The logical states and control lines (SEL OMRA, SEL RADR, R/W, DOD, UR*, and UW*) output from decoder 96 as a function of the two input bits on the RRD and RWR lines 135 are indicated in the following chart II. The two input lines RRD and RWR are capable of four different logical states, as indicated by the MODES M1, M2, M3 and M4 in the following CHART II.

CHART II

| MODES | RRD | RWR | SEL OMRA | SEL RADR | R/W | DOD | UR* | UW* |
|---|---|---|---|---|---|---|---|---|
| M1 | 1 | 0 | 0 | 1 | 1 | 1 | 1 | 0 |
| M2 | 0 | 1 | 0 | 1 | 0 | 0 | 0 | 1 |
| M3 | 1 | 1 | 1 | 0 | 0 | 0 | 1 | 1 |
| M4 | 0 | 0 | 0 | 1 | 0 | 1 | 1 | 1 |

In FIG. 2, the decoder 96 produces the SEL RADR line 113 which connects to the selection circuit 85 in FIG. 1. Similarly, decoder 96 produces the SEL OMRA line 112 which connects to the selection circuit 84 in FIG. 1. Decoder 96 produces the R/W line 115 for controlling with a 1 and 0 the reading and writing, respectively, into or out from the random access memory 24 in FIG. 1. The data out disable (DOD) line 111 from decoder 96 connects to the drivers 86 in FIG. 1 for controlling with a 0 and 1 the outputing or inhibiting, respectively, of data from the random access memory 24 to the RDATA bus 27. The decoder 96 provides the UW* line 140 and the UR* line 141 for controlling the buffer stores 022 and 023. When the UW* line is 0, data on the RDATA bus 27 is written into the buffer stores 022 and 023. When the UR* signal is 0, data is gated out from the stores 022 and 023 onto the RDATA bus 27.

Referring to CHART II, the mode M1 represents the conditions in which a supervisor machine has its address, RADR, on line 114 selected to address random access memory 24 in FIG. 1. The information accessed from the addressed location in memory 24 is not gated through disabled drivers 86. The RDATA data on bus 27 from buffer stores 022 and 023 is written into the addressed location of memory 24 under control of the R/W 1.

In CHART II, the M2 mode has the supervisor machine address RADR on bus 14 selected by circuit 85 for addressing memory 24 in FIG. 1. The drivers 86 are not disabled so that the information accessed from the RADR address is gated to the RDATA bus 27. The buffer stores 022 and 023 are energized to read data from the RDATA bus 27 when the R/W line 115 causes data to be read out from memory 24.

In CHART II, the M3 mode has the memory 24 controlled by the R/W line to read out information on to the RDATA bus 27. The drivers 86 are not disabled. The buffer stores 022 and 023 are disabled from reading or writing data on bus 27. The drivers 86 connect the output from memory 24 as an input to the object machine interpreter 5.

In CHART II, the M4 mode is the idle state in which no data transfers occur. The decoder 96 changes its output signals to correspond to a decode of the input signals when the supervisor machine clock signal SM W$\phi$2 is 1.

In FIG. 2, the buffer stores 020 and 021, associated with the supervisor machine, store the octal address of the enabled buffer store in the left bank of the object machine and store the octal address of the enabled buffer store in the right bank of the object machine, respectively. The 16-bit IVS bus 142 connects eight bits of data from the object machine buffer store 8-L2 to the supervisor machine buffer store 020 and connects eight bits of data from the object machine buffer store 8-R0 to the supervisor machine buffer store 021.

In FIG. 1, the left bank buffer store 8-L2 is a buffer store which is activated to store the address of any left bank buffer store which is being newly addressed. In a similar manner, the right bank buffer store 8-R0 is addressed to store the new address of any right bank buffer store which is being newly addressed. Only one buffer store in the left bank and only one buffer store in the right bank is activated at any one time. The buffer stores 8-L2 and 8-R0 store the address of the particular buffer stores in each bank which are activated at any given time.

In FIG. 3, the object machine 4 of FIG. 1 is shown in further detail. The 13-bit bus 28 from the address latches (ROM ADDR LAT) 20 operate through conventional address drivers (ROM ADDR DR) 26 to provide the RADR address on bus 28. The 13 binary bits define 8,192 locations in memory 24 of FIG. 1. Memory 24 includes a random access as previously described. Each of the locations in memory 24 stores up to 16 instruction bits, I0, I1 . . . I15 in locations BIT 0, BIT 1 . . . BIT 15. When an address is presented to memory 24 of FIG. 1 and the drivers 86 are enabled, 16 bits of an instruction are gated out on RDATA bus 27 and are latched in the instruction register 10 of FIG. 3 by a R$\phi$1 clock signal.

Referring to FIGS. 3 and 6, the clock signals are derived from a sequencer 30 which is a conventional timing means driven, for example, by a crystal controlled 10 MHz oscillator 29. Sequencer 30 develops, for example, a 100 nanosecond read cycle signal R$\phi$ followed by a 100 nanosecond write cycle signal W$\phi$ as shown in FIG. 6. The read cycle is further divided into 50 nanosecond first and second segments by signals R$\phi$1 and R$\phi$2 and similarly the write cycle W$\phi$ is divided into 50 nanosecond segments by signals W$\phi$1 and W$\phi$2. The clock signals from sequencer 30 are distributed to many locations throughout the FIG. 3 apparatus to provide for the basic timing of operations. Once each cycle at R$\phi$1 time an instruction is latched in register 10 and is presented to interpreter control (INTERP CONTROL) 11. The instruction in register 10 provides as inputs to interpreter control 11 a 3-bit C field, a 5-bit S field, a 3-bit L field and a 5-bit D field. For convenience, the three bits in the C field are designated C(x) where x equals 0, 1 and 2. The five bits in the S field are referred to as S(x) where x equals 0, 1 . . . 4. The three bits in the L field are referred to as L(x) where x equals 0, 1 and 2. The five bits in the D field are referred to as D(x) where x equals 0, 1 . . . 4.

The interpreter control 11 also receives as inputs the clock signals R$\phi$, W$\phi$, W$\phi$1 and W$\phi$2 from sequencer 30. Also control 11 receives as an input the SN0 signal from the latch 39 which designates that all bits on the A bus 32 have a 0 state.

With the indicated inputs, the interpreter control 11 functions to provide a plurality of output control signals. The 1-bit CNTC line from control 11 connects the count logic 21-2 to signal that the count in the program counter latches 21-1 is to be incremented by +1.

The 5-bit MAC bus produces five control signals MAC(x), where x equals 0, 1 . . . 4, which are input to the internal registers including the working registers 12, the selection circuit gates 14, and the accumulator 18. The MAC(x) signals for x equal to 1 . . . 4 address the internal registers whenever MAC(0) is 1. Whenever MAC(0) is 0, the IV buffer stores are addressed.

The 1-bit IVW* bus is input to the driver 74 to determine when information is gated out to the IV bus 2.

The 3-bit WRC bus includes the three signals WRC(x), where x equals 0, 1 and 2, which are input to the output field control circuit 44 for controlling the starting bit of data to be shifted.

The 3-bit RRC bus includes the three signals RRC(x), where x equals 0, 1 and 2, which are input to the barrel switch 15-1 of the input field control circuit 15 for controlling the starting bit of data to be rotated.

The 3-bit WLC* bus includes the three signals WLC(x)*, where x equals 0, 1 and 2, which are input to the store field control 44 for controlling the length of data selected.

The 3-bit RLC* bus includes the three signals RLC(x)*, where x equals 0, 1 and 2, which are input to the length mask 15-2 in the input field control circuit 15 for controlling the length of data selected.

The 5-bit IVC bus includes the five signals RB*, LB*, SCMD, WCMD and W$\phi$2 which are input to control the IV buffer stores 8 in the object machine 4 of FIG. 1.

The 3-bit RAC bus includes the three signals RAC(0), RAC(5), and RAC(8) which are input to control the ROM select circuitry 19.

The 1-bit INH line is input to the counter latches 21-1 to inhibit latching a new count at W$\phi$2 time if an XEC instruction is being executed.

The 3-bit ALU bus includes three or more signals input to the selection circuit 16 and the arithmetic and logic unit 17. The ALU control signals are conventional for controlling a standard arithmetic and logic unit 17 to perform standard functions commanded by the 3-bit instruction code from register 10.

The logical 1 or 0 value of the signals output from the interpreter control 11 are defined in terms of the logical level of the input signals in the following TABLE I. In TABLE I, a "." signifies a logical AND, a "v" signifies a logical OR, and a "*" signifies a logical complement. The control unit 11 is any conventional unit, such as a read-only memory or other device, which produces a logical output in response to a logical input.

and B buses are latched at R$\phi$ time at the input of the ALU 17 and the result appears on the 8-bit destination bus (DB) 22 during the W$\phi$ portion of each cycle. Unit 17 includes a high-order overflow output on 1-bit line 34 for use during an ADD instruction. If a 1-bit overflow occurs during an ADD instruction, an overflow indication is stored as a 1 in a carry flip-flop (CFF) 35 at W$\phi$2 time. If no overflow occurs, a 0 is stored in flip-flop 35 at W$\phi$2 time.

Selection circuits 14 and 16 which determine the operand inputs to unit 17 are conventional circuits for selecting one output from several inputs. Selection circuit 16 operates in response to the ALU signals from control 11 and selection circuit 14 operates in response to the MAC signals from control 11. The 8-bit B bus 33 is selected from BIT 8 through BIT 10 and BIT 11 through BIT 15 of the instruction register 10 and the eight bits from accumulator register 18. Selection circuit 14 selects output information onto the 8-bit source bus 31 from the 8-bit output from working registers 12, the 8-bit output from the receiver latches 37, or the 1-bit carry-out from flip-flop 35.

The information selected by circuit 14 on the source bus is input to the field control circuitry which includes the barrel switch 15-1 and the length mask 15-2. The barrel switch circuit 15-1 functions to end-around shift (rotate) the 8-bit input from bus 31 under control of the 3-bit RRC bus from control 11. The mask circuit 15-2 functions to force to 0 preselected bits in the rotated field from barrel switch 15-1 under control of the 3-bit RLC bus from control 11.

The source bus (SB) input bits to barrel switch 15-1 have the order SB0, SB1 . . . SB7 and, in the absence of any masking or rotation, produce the A bus output bits in the order A0, A1 . . . A7. The switch 15-1 and the rotate control (RRC) bits RRC0, RRC1, and RRC2 function in a conventional manner to rotate the sequence of SB bits on bus 31 by end-around-shifting to produce rotated outputs. For example, if the bits RRC0, RRC1 and RRC2 are all 0's, then the output sequence on the 8-bit bus 25 is the same as the input sequence SB0, SB1 . . . SB7 If the RRC bus bits are 110, signifying a 1-bit shift around then the input sequence SB0, SB1 . . .

TABLE I

| | | |
|---|---|---|
| MAC(x) | = | [S(x)*·R$\phi$vD (x)*·W$\phi$·C0*vS(x)*·W$\phi$·C0·C1·C2*]* |
| | | where x = 0, 1, . . . , 4 |
| WRC(x) | = | [D(x+2)*·C0*·D0vS(x+2)*·C0·C1·C2*·S0]* |
| | | where x = 0, 1, 2 |
| RRC(x) | = | [S(x+2)*·S0vL(x)·S0*·D0*·C0*]* |
| | | where x = 0, 1, 2 |
| WLC(x)* | = | [L(x)·D0·C0*vL(x)·S0·C0·C1·C2*]* |
| | | where x = 0, 1, 2 |
| RLC(x)* | = | [L(x)·S0]* |
| | | where x = 0, 1, 2 |
| SCMD | = | W$\phi$·[C0*·D0*·D2·D3·D4vC0·C1·C2*·S0*·S2·S3·S4] |
| WCMD | = | W$\phi$·[C0*·D0vC0·C1·C2*·S0] |
| IVW* | = | [SCMDvWCMD]* |
| RB* | = | [R$\phi$·(S0·S1vD0·S0*) vW$\phi$·(C0*·D1vC0·S1)]* |
| LB* | = | [RB]* |
| CNTC | = | [C0·C1*·C2*vC0·C1·C2vC0·C1*·C2·SN0]* |
| RAC(0) | = | [C0·C1·C2vW$\phi$1]* |
| RAC(5) | = | [C0·C1·C2vC0·C1*·C2*·S0*vC0·C1*·C2·SN0·S0*vW$\phi$1]* |
| RAC(8) | = | CNTC |
| INH | = | C0·C1*·C2* |

In FIG. 3, the arithmetic and logic unit (ALU) 17 performs 8-bit unsigned 2's complement arithmetic. The unit 17 is conventional and carries out the ADD, the AND and the XOR (exclusive-or) instructions under control of the signals from the ALU bus from control 11 on two data inputs. The two data inputs to the unit 17 are the 8-bit A bus 32 from mask circuit 15-2 and the 8-bit bus 33 from selection circuit 16. The inputs on the A SB7 is shifted with an output sequence on bus 25 of SB7, SB0, SB1 . . . SB6. In a similar manner, if the RRC bits from control logic 11 are 100, signifying a 3-bit shift, the output sequence is SB5, SB6, SB7, SB0, SB1, SB2, SB3, SB4.

The mask circuit 15-2 receives on bus 25 the end-around shifted source bus bits and transmits selected bits to the A bus 32 while forcing other bits to 0. Bits are forced to 0 as a function of the 3-bit RLC* field from the control logic 11 in a conventional manner. If the three bits RLC0*, RLC1* and RLC2* are 110, representing selection of a 1-bit field, then seven high-order bits A1, A2 . . . A7 on bus 25 are forced to all 0's while A0 has its unaltered 1 or 0 state as derived from switch 15-1. If the RLC* bits are 010, representing the selection of a 5-bit field, then the five lower-order bits A0 . . . A4 from switch 15-1 pass unaltered and all higher-order bits A5 . . . A7 are forced to 0. If the RLC* bits are 111 (the L field is 000) representing a field length of 8 bits, all bits pass unaltered.

The barrel switch 15-1 and the length mask 15-2 are conventional circuits operated in a conventional manner.

In FIG. 3, the seven 8-bit working registers 12, the 8-bit accumulator (or auxillary) register (AUX) 18 and the 1-bit carry flip-flop 35 constitute the addressable internal data registers of the interpreter. Those registers are addressed by four bits (MAC 1 . . . MAC 4) of the 5-bit MAC bus. The seven registers 12 are designated by the octal addresses 01, 02, 03, 04, 05, 06 and 11 which have corresponding binary values 0001, 0010, 0011, 0100, 0101, 0110, and 1001, respectively. The accumulator register 18 is designated by octal address 00 (binary 0000) and the carry flip-flop 35 is designated by octal address 10 (binary 1000).

The addressable internal data registers provide temporary storage for data. Data transfers between the internal registers are always on a full 8-bit basis. Transfers to the 8-bit IV buffer stores 8 in object machine 4 of FIG. 1, however, may be with a field length, L, of any value from 1 to 8 bits. The bit numbering for the eight bits in each of the internal data registers and in the buffer stores is BIT 0, BIT 1 . . . BIT 7 proceeding from left to right. The most significant bit is BIT 0 and the least significant bit is BIT 7.

In addition to the octal addresses of the internal data registers previously given, the octal address 07 (binary 0111) is designated for the address specification of the left bank 8-L of IV buffer stores (IVL) and octal address 17 (binary 1111) is designated for the address specification of the right bank 8-R of IV buffer stores (IVR) in FIG. 1. The IVL and IVR addresses (07 and 17) are utilized whenever MAC0 is 0 for setting the enable latch in an addressed one of the IV buffer stores while all non-addressed IV buffer stores have an enable latch reset. Specifically, when register octal address 07 is specified (IVL), an 8-bit address is placed on IV bus 2 and that address is detected by one out of a possible of 256 left bank stores (stores 8-L0, 8-L1, and 8-L2 are specifically indicated in FIG. 1) and has its enable latch set provided SCMD is 1, WCMD is 0, LB* is 0, and Wφ2 is 1. Those signals are described in connection with a typical buffer store in FIG. 4. Similarly, when register octal address 17 is specified (IVR), an 8-bit address is placed on IV bus 2 and is detected by one of a possible 256 right bank buffer stores, (store 8-R0 is specifically indicated in FIG. 1) or an equivalent working store 9 location, provided SCMD is 1, WCMD is 0, RB* is 0 and Wφ2 is 1. Whenever an address of a left bank store or a right bank store is placed on bus 2, that address is also stored in buffer store 8-L2 or 8-R0, respectively.

The AUX register 18 is used in the ADD, the AND, and the XOR instructions where its contents are combined with the source operand from source bus 31. The contents of the AUX register 18 are those instructions are not explicitly referenced in the instructions unless it is also the source of both input operands or the destination of the result operand. Under the latter case, the AUX register is referenced in the same manner as any other register. The contents of the AUX register 18 are unchanged by the ADD, AND and XOR instructions unless that register has been specified in the instructions as the destination register for the result operand. The AUX register may be addressed like any other data register for the NZT, XMIT and XEC instructions.

The internal address space of the internal registers includes the eight locations 0000, 0001 . . . 0111 and the eight locations 1000, 1001 . . . 1111. Eleven of these sixteen internal address locations are occupied in the manner previously indicated. The five address locations 1010, 1011, 1100, 1101 and 1110 are empty and produce a null condition if addressed. The 16 internal address locations are addressed by the signals MAC 1, MAC 2 . . . MAC 4 from the 5-bit MAC bus. The fifth bit MAC 0, functions as an enable signal to enable the output of an internal register addressed by the signals MAC 1 . . . MAC 4. Whenever MAC0 is 0, the addressed internal register provides an output. Whenever MAC0 is 1, no output occurs from an internal register since when MAC0 is 1 an IV buffer store is accessed to provide a source operand or store a result operand. The particular buffer store accessed when MAC0 is 1 is the particular one in the left or right bank which was last addressed when MAC0 was 0 and the left bank select address 0111 or the right bank select address 1111 was accessed. In this manner, the address of an external buffer store is specified by addressing an internal address (0111 for a left bank buffer store or 1111 for a right bank buffer store).

In FIG. 3, the instruction address formation apparatus includes the 13-bit ROM address latches 20 which are latched at time Wφ1 with addresses selected by the ROM select (ROM SEL) circuits 19. Select circuits 19 function under control of the 3-bit RAC bus to select various input fields for address bits, BIT 0 through BIT 12. Address bits BIT 8 through BIT 12 are selected under control of RAC(8) either from the high-order five bits of the arithmetic and logic unit 17 or from the high-order five bits from the program counter latches 21-1 via the +1 count logic 21-2. Address bits BIT 5 through BIT 7 are selected under control of RAC(5) either from the remaining bits of the arithmetic and logic unit 17 or from BIT 5 through BIT 7 from the program counter latches 21-1. Address bits BIT 0 through BIT 4 are selected under control of RAC(0) either from the low-order count of the program counter latches 21-1 or from the BIT 3 through BIT 7 S field of the instruction register 10.

The selection of which inputs are latched into the address latches 20 is under control of the control 11. The control 11 receives the 3-bit instruction code C0, C1, C2 from the instruction register 10 and also receives a zero detect signal, SNO, on line 42 from a zero detect latch 39. The zero detect latch 39 is latched at the Rφ time with a signal from a zero detector 38. Zero detector 38 is, for example, a 8-way NAND gate which senses the all 0's condition of the source field on A bus 32 and responsively provides a signal to latch 39 when the condition is detected.

The 13-bit ROM address stored in latches 20 at Wφ1 time is transferred, under most conditions, to the program counter latches (PROG CTR LAT) 21-1 at Wφ2 time. The current count in latches 21-1 is incremented by 0 or +1 by count logic 21-2. The address stored in latches 20 is determined by the RAC bus and the CNTC line as determined by TABLE I and as tabulated in the following COUNT LOGIC, TABLE II. In the following TABLE II, the ROM address latches 20 are always latched at the Wφ1 time. The program counter latches 21-1 are always latched at the Wφ2 time except that during an XEC instruction an INH signal from control 11 inhibits the Wφ2 signal from loading a new count into the program counter latches 21-1.

TABLE II

| INSTRUCTION | C₂ | C₁ | C₀ | COUNT LOGIC INCREMENT PROG. CTR. | ROM SEL |
|---|---|---|---|---|---|
| MOVE | 0 | 0 | 0 | +1 | CTR LAT(0-12) |
| ADD | 1 | 0 | 0 | +1 | CTR LAT(0-12) |
| AND | 0 | 1 | 0 | +1 | CTR LAT(0-12) |
| XOR | 1 | 1 | 0 | +1 | CTR LAT(0-12) |
| XEC | 0 | 0 | 1 | +0 | IF IV; ALU(3-7)+CTR LAT(0-7) |
|  |  |  |  |  | IF REG; ALU(0-7)+CTR LAT(0-4) |
| NZT | 1 | 0 | 1 | SN0=0; +1 | CTR LAT(0-12) |
|  |  |  |  | SN0=1; +0 | IF IV; ALU(3-7)+CTR LAT(0-7) |
|  |  |  |  |  | IF REG; ALU(0-7)+CTR LAT(0-4) |
| XMIT | 0 | 1 | 1 | +1 | CTR LAT(0-12) |
| JMP | 1 | 1 | 1 | +1 | ALU(0-7)+(S of IR) |

In FIG. 3, the 8-bit designation bus 22 connects to the ROM select circuit 19, to the accumulator 18, to the working registers 12 and to the destination field control circuit 44. The destination field control circuit 44 functions, in response to the WLC* and WRC signals from interpreter control 11, to provide output data to the driver circuit 74. Driver circuit 74 connects to the IV bus 2.

Field control circuit 44 is a conventional device for selecting and aligning input data from the 8-bit latch bus 50 and from the 8-bit data bus 22 to provide 8-bit output data on bus 36 which connects through the drivers 74 to IV bus 2. The input data bus (DB) 22 carries bits DB0, DB1 ... DB7. The input latch bus (L) 50 carries bits L0, L1 ... L7. The output bus 36, after connection through the drivers 74 to IV bus 2, carries the output bits IV0, IV1 ... IV7. The 0 bits are the highest order and the 7 bits are the lowest order. The WRC signals specify in binary notation, the lowest-order bit of the output IV bits in which the lowest-order bit of the DB bits is written. The WLC* signal specifies, in binary notation, the number of DB bits which are selected from the DB bus 22 for transmission to the IV bus 2. The remainder of the bits to make a total of eight for transmission to the IV bus are taken from the L bus 50. By way of example, it is assumed that the WRC signal is 100 specifying that the lowest-order bit of DB bus 22, DB7, will be written into the L4 position of IV bus 2 because L4 is the fourth bit (binary 100) over from the lowest-order bit L7. It is also assumed by way of example that WLC equals 011 (WLC* equals 100) indicating a length of three bits. The 3-bit length indicates that bits DB5, DB6, and DB7 from bus 22 will be transferred to the IV bus. The WRC signal indicates that the DB5, DB6, DB7 bits will be located in the IV2, IV3 and IV4 bit locations of the IV bus. The IV0, IV1, IV5, IV6, and IV7 output locations of the IV bus contain the L0, L1, L5, L6, and L7 bits, respectively, from bus 50. With the WRC and WLC signals as indicated, the eight IV output bits contain L0, L1, DB5, DB6, DB7, L5, L6 and L7.

The driver circuit 74 includes conventional gates which transmit the eight bits of bus 36 onto the 8-bit IV bus 2 whenever an IVW* signal is 0 as provided by the interpreter control 11.

In FIG. 3, each of the IV buffer stores 8 of FIG. 1 receives the 8-bit IV bus 2 and four bits of the 5-bit IVC bus 45 from interpreter control 11. In FIG. 1, all of the buffer stores, like stores 8-L0, 8-L1 and 8-L2, in the left bank receive three common lines SCMD, WCMD, and Wφ2 and the LB* line where the LB* line is utilized to enable the left bank of buffer stores. All of the right bank buffer stores, like store 8-R0, receive the three common lines SCMD, WCMD and Wφ2 and the single RB* line where the RB* line is utilized to enable the right bank of buffer stores. Each of the buffer stores 8 is connected by an 8-bit user data bus 3 to user devices or to the working store 9 as shown in FIG. 1. Each IV buffer store connected to a user device provides eight independent control points on a bus 3 which are individually addressable by the user system with commands on a bus 47. (See FIG. 4). Each IV buffer store may be used in either a bi-directional or uni-directional mode in which the bus 47 commands define the direction of data flow between the user device and the IV buffer store.

Each of the IV buffer stores, except buffer store 8-R3, contains a non-alterable address. Each buffer store may be assigned a non-alterable different and unique address or two or more buffer stores may have the same non-alterable address. If each buffer store is assigned a unique address, the interpreter 5 can uniquely address each buffer store. When a buffer store address is placed on the IV bus 2 and appropriate control signals are applied on the IVC bus, a decoder in each buffer store is activated to detect whether the address on the IV bus is the address of the respective IV buffer store. Any buffer store recognizing its preassigned address on the IV bus enables itself and stores an enable condition. Each buffer store which does not recognize its address on the IV bus disables itself and stores a disable condition. Thereafter, all subsequent read/write operations from the interpreter 5 to the buffer stores are carried on with only enabled buffer stores. The accessing of locations in addressed buffer stores is on a variable field length basis. For 8-bit IV buffer stores, the field length is from 1 to 8 bits. The user read and write operations between a user device and an IV buffer store occur irrespective of whether the particular store is enabled or not for communication with the interpreter.

In FIG. 4, a general block diagram of a typical IV buffer store 8 is shown. The buffer store includes eight latches 53 which are connected in common through drivers and receivers (DR/REC) 51 to the 8-bit user device bus 3 and through drivers and receivers (DR/REC) 52 to the 8-bit IV bus 2. The IV control 54 is responsive to the user command bus 47 which carries the signals UR* and UW*. Also the IV control 54 is also responsive to four processor control commands from the 5-bit IVC bus 45 which carries the signals Wφ2, SCMD, WCMD and ME*. The ME* signal line in each of the buffer stores, of which the IV buffer store of FIG. 4 is typical, connects either to the RB* line or the LB* line of the IVC bus 45 depending whether or not the particular buffer store is in the right bank or the left bank, respectively. In FIG. 4, the address detector 48 receives the 8 lines from the IV bus 2. Detector 48 functions to detect whenever an address appears on the IV bus 2 which matches a preselected address stored in detector 48.

The buffer store of FIG. 4 has three modes for communicating with the interpreter 5 of FIG. 1. The three modes are read out (to the interpreter), write (information from the interpreter), and address enable/disable. In the read out mode, SCMD is 0, WCMD is 0, and IVW* is 1, and ME* (from RB* or LB*) is 0. In the write mode, WCMD is 1, SCMD is 0, Wφ2 is 1, IVW* is 0 and ME* (from RB* or LB*) is 0. For the address enable/disable mode, SCMD is 1, WCMD is 0, IVW* is 0, Wφ2 is 1, and ME* (from RB* or LB*) is 0.

Further details of the buffer stores are described in the above cross-referenced application in connection with FIG. 4 therein and those details are hereby incorporated by reference into the present specification.

In FIG. 1, the working store 9 is a conventional memory which stores, in one example, 256 8-bit bytes of data. The working store 9 is configured, for example, with standard 82S16 memory chips manufactured by Signetics Corporation. Eight of the chips are utilized for a 256-byte memory. In one embodiment of the present invention, the working store 9 is divided into pages of 128 bytes per page. Of course, no pages or any number of pages can be utilized.

The working store 9 is addressed by eight address bits in the manner shown and described in the above cross-referenced application in connection with FIG. 2 therein which details are incorporated by reference in the present specification.

In FIG. 5, the buffer stores 8-L0 and 8-L1 are identical to the like indicated devices in FIG. 1. As a typical example, the buffer stores are interconnected to a floppy disc drive 7-1. The floppy disc drive in one preferred embodiment is a Memorex model 651 drive. Buffer store 8-L0 is connected with the UR* input positive (1) and the UW* input at ground (0) so that the store always outputs data to the disc drive 7-1. Similarly, the buffer store 8-LI is connected with UW* positive (1) and UR* ground (0) so that data is always connected from the disc drive 7-1 to the store 8-L1.

Instruction Set

The eight instructions in the following TABLE III have one of four formats as listed in the following TABLE IV. Each of the instructions has 16 bits, namely, BIT 0, BIT 1 . . . BIT 15. The instructions, depending upon the format may contain 1, 2, or 3, operands. In all instructions, BIT 0 through BIT 2 is the operation (OP) code which specifies one of the eight instructions of TABLE III below.

TABLE III
INSTRUCTION SET

| OP CODE | INSTRUCTION |
|---------|-------------|
| 000 | MOVE S, L, D |
| 001 | ADD S, L, D |
| 010 | AND S, L, D |
| 011 | XOR S, L, D |
| 100 | XEC I, L, S (I, S) |
| 101 | NZT I, L, S (I, S) |
| 110 | XMIT I, L, S(I, S) |
| 111 | JMP A |

TABLE IV
INSTRUCTION FORMAT

```
    0 2 3     7 8 10 11      15
F I  |OP| S  | L |    D      |   MOVE,ADD,AND,XOR
      REG/IV     REG/IV 0 2 3     7 8              15
F II |OP| S  |        I        |   XMIT,XEC,NZT
      REG  LITERAL DATA 0 2 3     7 8 10 11         15
F III|OP| S  | L |      I       |   XMIT,XEC,NZT
      IV        LITERAL DATA 0 2 3                      15
F IV |OP|         A             | JMP
           ROM ADDRESS
```

The FI format is employed for the MOVE, ADD, AND, and XOR (exclusive-or) instructions. In format FI, BIT 3 through BIT 7 represents the source (S) field. BIT 8 through BIT 10 represent the L field, which designates as length or an end-around rotate. BIT 11 through BIT 15 represent the destination (D) data address.

The FII format is employed in connection with the XMIT, XEC, NZT instructions. In format FII, BIT 3 through BIT 7 represent the S field. BIT 8 through BIT 15 represent the immediate (I) data field.

The FIII format is also employed for XMIT, XEC, NZT instructions. BIT 3 through BIT 7 are employed for the S field. BIT 8 through BIT 10 are employed for the L field. BIT 11 through BIT 15 are employed for the I field.

The format FIV is employed for the JMP instruction BIT 0 through BIT 2 are used for the OP code. BIT 3 through BIT 15 are used for the ROM address(A).

In the above instruction formats, the source (S) or destination (D) address are either a register address (REG) or an IV buffer store bit address (IV). The address type is determined by the BIT 0 of the S field and BIT 0 of the D field. If BIT 0 is 0, then BIT 1 through BIT 4 define a register address in binary notation. If BIT 0 is 1 then, BIT 2 through BIT 4 define a buffer store IV bit address in binary notation. The address range within any IV buffer store is 0, 1 . . . 7. If BIT 0 is 1 indicating that a buffer store bit address has been defined, then BIT 1 of the S or D field is employed to specify a left bank or right bank selection. If when BIT 0 is 1, BIT 1 is 0, a left bank buffer store is specified. If when BIT 0 is 1, BIT 1 is 1 then a right bank IV buffer store is specified.

In the above instruction formats, the L field significance is determined by the type of instructions and by the type of operands.

If a MOVE, ADD, AND or XOR instruction specifies a REG-REG operation (i.e., BIT 0 for both S and D is 0 specifying register addresses) the L field specifies a right end-around shift of the L field value of the source register data before the instruction is executed. However, if one of those instructions specifies a REG-to-IV or an IV-to-IV operation (i.e., BIT 1 of either the S or D field as a 1 thereby specifying an IV destination address), the L field specifies the length of the IV data.

If an XMIT, XEC, or NZT instruction specifies a register for the S operand (BIT 0 of the S field is 0), the L field becomes the left most three bits of the I field (i.e., I equals L catenated D). If one of those instructions specifies an IV bit address in the S operand (i.e., BIT 0 of the S field is a 1), the L field specifies the length of the IV data. In this latter case, the maximum length of the I data is 5 bits (I equals D). If the length of the IV data is greater than 5 bits, a number equal to L minus 5 of leading 0's are appended to the I data, but the operation itself determines the length of the data field utilized. For an XMIT instruction, L bits are transferred with L minus 5 leading 0's. For the XEC instruction, only 5 bits are used to form the address value catenated to the program counter count. For the NZT instruction, L bits of the S field are tested for non-zero and the 5 bits of the I field are used to form the address value.

If L specifies register rotate (right end-around shift) or an IV field length (the conditions where L is not part of the immediate data), L may have any value from 1 to 8 where 8 is represented by L=000.

The I data field for the XMIT, XEC, or NZT instruction is either an 8-bit field or a 5-bit field depending upon the nature of the S operand. If the S operand is a register address (BIT 0 of S is 0) the I field is composed of the L and D fields and totals 8 bits. If the S operand specifies an IV bit bus (BIT 0 of S is 1), the I data is a 5-bit field, BIT 11 through BIT 15.

In the JMP instruction, BIT 3 through BIT 15 are considered as a single 13-bit address. The 13 binary bits represent an address in the ROM between 0 and 8191.

MOVE Instruction

In the MOVE instruction, the contents of S are moved to D. If both S and D are register addresses, L specifies a right end-around shift (rotate) of the S field before the move is performed. The contents of S are unchanged unless D is the same as S. If either or both S and D are IV bit addresss, L specifies the length of the IV data and no end-around shift is formed. If the data flow is between a REG and an IV buffer store, only the L right most bits of the register are utilized. Specifically, the MOVE instruction of an operand from the IV buffer store to a register will right-adjust the data with left leading 0's as necessary. Specifically, a MOVE from a register to an IV buffer store will move the L right most bits. If the data flow is from an IV buffer store to an IV buffer store, L specifies the length of both IV fields. An IV bit address specifies the right most bit (K) of the IV data. If L is greater than K+1, (i.e., if the IV field is not contained within BIT 0 through BIT K), a wrap around of data will occur on a read operation and the L-(K+1) most significant bits will be lost on a write operation. If a MOVE is specified from a left bank buffer store to a right bank buffer store or vice versa, the complete source left word is transferred with BIT 0 transferred to BIT 0, BIT 1 transferred to BIT 1 and so forth with the exception that the right most bits specified by S and L will be stored in the bit position specified by D and L.

ADD, AND, XOR Instructions

The ADD, AND and the XOR instructions are performed on the operand specified by the contents of S and the contents of the AUX register 18 and the result is stored in D. The contents of the AUX register or the location specified by S are unchanged unless D specifies AUX or D specifies S, respectively. If both S and D are register addresses, the contents of S are right end-around shifted L places before being combined with the contents of AUX.

If either or both S and D are IV bit addresses, L specifies the length of the IV data and no end-around shift is performed. If S is a register, the full 8 bits are combined with the contents of AUX. If S specifies an IV buffer store address, the L bits read from the IV buffer store are right-adjusted with 0's filled in on the left to complete the 8-bit field. In both cases, the instructions ADD, AND, or XOR produce an 8-bit result. If D is a register, the full 8-bit result is stored in the register. If D is an IV buffer store address, the L right most bits of the result are stored into the IV buffer store and the unaddressed bits in the IV buffer store are unaltered by the store operation.

If S and D specify different IV buffer stores, then the data specified by the S IV buffer store will replace all bits of D with BIT 0 of S going to BIT 0 of D and so on for each of the other bits BIT L . . . BIT 7 except that the bit positions D in the IV buffer store specified by the address identified by D and L will contain the results of the arithmetic operation.

XEC Instruction

The XEC instruction takes the ROM address (or RAM address) specified by the current contents of the program counter and forms a new address by catenating a high-order portion of the ROM address with a value determined by the S, L and I fields. If S is a register address, the length of the I field is 8 bits and the catenating value is formed by the sum of the I and S fields. If S specifies an IV bit address, then the I field is 5 bits and the L specifies the length of the IV bit field. L may be greater than 5. If S specifies a register address, an 8-bit value formed from the sum of the I field and the contents of the register specified by the S is catenated to the leading 5 bits of the address in the program counter. If S specifies an IV bit address, an 8-bit value is formed from the sum of the I field (including 5 bits with high-order leading 0's) and the contents of the IV data field (the number of bits specified by L with leading 0's as necessary), but only the right-most 5 bits are catenated to the leading 8 bits of the ROM address in the program counter. In the case of a register address, the address range (range size) is 256 bits. In the IV bit address case, the address range is 32 bits.

NZT Instruction

In the NZT instruction, the control logic causes the ROM address specified by the program counter to be altered by catenating a high-order portion of that address with the I field provided that the contents of a location specified by S is not all 0's. The length of the I field is 8 bits if S specified a register address. The length of the I field is 5 bits if S specifies an IV bit address where the L address specifies the length of the IV bit field. L may be greater than 5. If S specifies a register address, the 8-bit I field is catenated to the leading 5 bits of the ROM address in the program counter provided S does not equal 0. If S specifies an IV bit address, the 5-bit I field is catenated to the leading 8 bits of the ROM address specified by the program counter provided S does not equal 0. In the case of a register address, the address range is 256 and in the case of an IV bit address, the address range is 32.

XMIT Instruction

The XMIT (transmit) instruction takes the I field and transmits it to the address specified by S. If S is a register address, the I field is 8 bits. If S is an IV bit address, the I field is 5 bits and L specifies the length of the IV data field. If L is greater than 5, then L minus 5 leading 0's are appended to the I field when it is transmitted to the IV buffer store. If the IV bit address is K and L is greater than K+1 (i.e., the IV data field is not contained within BIT 0 through BIT K), the L minus (K+1) left-most bits of the I field are not transmitted.

JMP Instruction

The JMP (jump) instruction causes the A field to be placed in the program counter thereby effecting an unconditional jump to the ROM address specified by the A field. The 13-bit A field specifies a maximum address value of 8191. If not all addresses have been specified and a JMP instruction causes a jump to a non-existent ROM address, that is an address beyond the range specified, the apparatus does not detect the non-existent condition. Subsequent ROM accesses will return all 1's which will be decoded as JMP 8191. If 8191 is also a non-existent address, the apparatus will be locked at this address.

Operation of Object Machine

The apparatus of the present invention is highly flexible and can be programmed to carry out many control functions. As an example, the user device (UD) 7-1 in FIG. 1 is a floppy disc interconnected as shown in FIG. 5. The user device 7-2 of FIG. 1 is a keyboard/printer device, such as an IBM Selectric typewriter. Information in large blocks is stored in the floppy disc. The keyboard/printer allows the keyboard to direct data to the printer output. Inputs via the keyboard are used to modify data stored in the floppy disc. The working store 9 is employed to store small data blocks from the floppy disc. Data blocks in the working store are reviewed and edited by a human operator under control of controller 4. In such a system, the program of instructions in the memory 6 continuously monitors the output from the keyboard of device 7-2. For example, an XEC instruction is repeatedly executed until a completed input from user device 7-2 is observed in the buffer store 8-4. Upon receiving a completed input from device 7-2, the XEC instruction shifts to a new sequence of instructions as a function of the input from user device 7-2. While many alternative exist in programming, the following program in TABLE V is a useful example for explaining the system operation.

TABLE V

| LOOP: | | |
|---|---|---|
| XMIT | IV-L1, IVL | I1, I7, I13 |
| MOVE | IV FIELD 4-3, R1 | I2, I8, I14 |
| XMIT | IV-L0, IVL | I3, I9, I15 |
| XEC | TAB(R1) | I4, I10, I16 |
| JMP | LOOP | I6, I12, |
| . | | |
| TAB: | | |
| 000 | XMIT 101, IV FIELD 6-3 | I5 |
| 001 | XMIT 100, IV FIELD 6-3 | |
| 010 | XMIT 111, IV FIELD 6-3 | I11 |
| 011 | JMP (OUT) | I17 |

In instruction I1, the 8-bit binary address of the left bank buffer store L1 (buffer store 8-L1 in FIG. 1), is transmitted from the I field of the instruction to the destination location IVL. As previously explained, the IVL location specifies the internal address octal 07 which is the address which gates the I field of the I1 instruction onto the IV bus 2 for the purpose of setting the enable latch in one of the buffer stores 8. The buffer store 8-L1 in FIGS. 1 and 5 detects its own address in the manner previously described. The I1 instruction, therefore, addresses the buffer store 8-L1 which, as shown in FIG. 5, receives control lines from the floppy disc drive 7-1.

The I2 instruction functions to access a particular field from the addressed buffer store 8-L1. The particular field accessed is the 3-bit field starting with BIT 4. Accordingly, BIT 4, BIT 3 and BIT 2 are moved from the buffer store 8-L1 to the R1 register (octal address 01) in the working register 12. The R1 register is specified in the D field of the I2 MOVE instruction. In TABLE V, the 3-bit field for BIT 4, BIT 3 and BIT 2 is assumed to be 000. Referring to FIG. 5, a 000 for those bits indicates that there is write protection (WR PROTECT*), that there is an unsafe condition (UNSAFE*), and that the head is on track 0 (TRKɸɸ).

The I3 instruction causes the 8-bit binary address of the left bank L0 buffer store (buffer store 8-L0 in FIGS. 1 and 5) to be addressed for setting its internal enable latch while all other left bank buffer stores have their enable latches disabled.

The instruction I4 causes the instruction address formation circuitry to address a table of instructions at a high-order address specified by an address (TAB) in the XEC instruction. The entry in the table, that is the low-order address, is specified by the R1 field. In FIG. 1, the memory selection circuitry 40 causes the table address to be formed as a combination of the S field catenated with the R1 field stored in the R1 register during the I2 instruction. In the particular example chosen for explanation, the field in register R1 is 000 indicating the first instruction in the table. The instruction I5 causes the bits 101 to be transmitted to the 3-bit field commencing with BIT 6 of the buffer store last addressed. The last addressed buffer store was buffer store 8-L0 which was addressed in the I3 instruction. The 101 signal has the effect of not enabling the write signal (WR ENB*), resetting the unsafe signal (UNSAFE RESET*) and unloading the head (LOAD HEAD*).

The instruction I6 takes the contents of the program counter minus a quantity 4 as the new address for the I7 instruction which is the same as the I1 instruction. The instructions I7, I8, I9 and I10 are a repetition of the instruction I1, I2, I3 and I4, respectively. In the I8 instruction, the 3-bit field in buffer store 8-L1, in the assumed example establishes the R1 field as 010. The I10 instruction.

The I11 instruction transmits a 111 field to the BIT 6, BIT 5, BIT 4 field of buffer store 8-L0 thereby energizing the indicated control lines to the floppy disc drive.

The I12 instruction causes the address to return so that the I13 instruction is the same as the I1 and I7 instructions. The I13, I14, I15 and I16 instructions are identical to the I1, I2, I3 and I4 instructions, respectively. In the I14 instruction, the R1 field, in the example assumed, is stored as O11. In the I16 instruction, the address jumps to the table entry 011 for instruction I17.

The I17 instruction causes the program address to jump to a new instruction location (OUT) which designated the end of the program or some other section in the program.

Operation of Supervisor Machine

The object machine 4 of FIG. 1 is programmed to execute the instructions in TABLE V above and the supervisor machine 4' of FIG. 1 executes the program of TABLE VI below. Prior to commencing the TABLE VI program, certain programming preconditions are established in the supervisor machine. The STBXA bit and the PCRA bit in the O12 buffer store are set to 1 and 0, respectively. With these settings, each memory address on the output bus 28 of FIG. 3 is loaded into the EXADR register 88 and from there into the buffer stores 016 and 017.

The supervisor machine 4 continually interrogates the keyboard 103 of FIG. 2 by examining the buffer store 005. The supervisor program of TABLE VI below commences at a time just after the keyboard 103 has been actuated with a stop command which signifies that the object machine is to be halted. It is assumed, for purposes of explanation, that the stop command is received by the supervisor machine at a time when the object machine is at instruction I3 in TABLE V above.

TABLE VI

1. HALT THE OM INTERPRETER.
    - 1-1 XMIT XHALT, IVL      SELECT RUN/HALT IV BYTE
    - 1-2 SMIT 1, HALT      1=HALT
2. SAVE THE CURRENT OM PROGRAM COUNTER (PC) IN WORKING STORAGE (CNTXTM,N).
    - 2-1 XMIT XEXADRH, IVL      SELECT UPPER 5 BITS OF PC
    - 2-2 MOVE EXADRH,R6
    - 2-3 XMIT XCNTXTM,IVR
    - 2-4 MOVE R6,CNTXTM      MOVE TO WS
    - 2-5 XMIT XEXADRL,IVL      SELECT LOWER 8 BITS OF PC
    - 2-6 XMIT XCNTXTN,IVR
    - 2-7 MOVE EXADRL,CNTXTN      MOVE TO WS
3. COMPOSE 'XMIT XIV-L1,IVL' INSTRUCTION TO SELECT THE FLOPPY DISC STATUS BYTE.
    - 3-1 XMIT XCNTXTS,IVR      SELECT ADDRESS OF IV-L1
    - 3-2 MOVE CNTXTS,R2
    - 3-3 XMIT XCNTXTT,IVR      SELECT BANK OF IV-L1
    - 3-4 MOVE CNTXTT,R6
    - 3-5 XMIT 307H,AUX
    - 3-6 ADD R6(5),R3      UPPER 8 BITS OF XMIT IN R3
    - 3-7 MOVE R2,R4      LOWER 8 BITS OF XMIT IN R4
    - NOTE: STEPS 4-7 BELOW PERFORM THE XMIT INSTRUCTION JUST COMPOSED. STEP 8 CONTINUES WITH THE CONTROL ACTIONS TO RETRIEVE THE CONTENTS OF IV-L1.
4. READ INSTRUCTION AT PC, I.E. (PC), TO IV FIELD (RDATA).
    - 4-1 XMIT XEXADRH,IVL      SELECT UPPER 5 BITS OF PC
    - 4-2 MOVE EXADRH,R5
    - 4-3 XMIT XEXADRL,IVL      SELECT LOWER 8 BITS OF PC
    - 4-4 MOVE R5(6),AUX
    - 4-5 ADD DMYL01,R5      UPPER 7 BITS OF OM ADDRESS
    - 4-6 MOVE DMYL27,R6      LOWER 6 BITS OF OM ADDRESS
    - 4-7 XMIT XRADRH,IVL
    - 4-8 MOVE R5,RADRH
    - 4-9 XMIT XRADRL,IVL      SELECT LOWER 6 BITS and R/W CONTRO
    - 4-10 MOVE R6, RADRL
    - 4-11 XMIT 1, RRW      1=READ (RADR) TO RDATA
    - 4-12 XMIT 3, RRW      3=TURN OFF READ
5. SAVE INSTRUCTION AT PC (RDATA) IN WORKING STORAGE (CNTXTG,H), AND REPLACE WITH R3 AND R4.
    - 5-1 XMIT XCNTXTG, IVR
    - 5-2 XMIT XRDATAH, IVL
    - 5-3 MOVE RDATAH, CNTXTG      SAVE UPPER 8 BITS OF (PC)
    - 5-4 MOVE R3,RDATAH      UPPER 8 BITS OF NEW INSTRUCTION
    - 5-5 XMIT XRDATAL, IVL
    - 5-6 XMIT XCNTXTH, IVR
    - 5-7 MOVE RDATAL, CNTXTH      SAVE LOWER 8 BITS OF (PC)
    - 5-8 MOVE R4,RDATAL      LOWER 8 BITS OF NEW INSTRUCTION
    - 5-9 XMIT XRRW,IVL      SELECT OM MEMORY R/W CONTROL
    - 5-10 XMIT 2,RRW      2=WRITE NEW INSTRUCTION TO OM MEMOR
    - 5-11 XMIT 3,RRW      3=TURN OFF WRITE
6. STEP OM INTERPRETER TO PERFORM NEW INSTRUCTION.
    - 6-1 XMIT XHALT, IVL
    - 6-2 XMIT 0,HALT      START OM INTERPRETER
    - 6-3 XMIT 1,HALT      STOP OM AFTER ONE INSTRUCTION
7. RESTORE (PC) FROM WORKING STORAGE.
    - 7-1 XMIT XCNTXTH, IVR      SELECT LOWER 8 BITS OF SAVED (PC)
    - 7-2 XMIT XRDATAL, IVL
    - 7-3 MOVE CNTXTH,RDATAL
    - 7-4 XMIT XRDATAH, IVL
    - 7-5 XMIT XCNTXTG, IVR      SELECT UPPER 8 BITS OF SAVED (PC)
    - 7-6 MOVE CNTXTG, RDATAH
    - 7-7 XMIT XRRW, IVL
    - 7-8 XMIT 2,RRW      RESTORE (PC) TO OM MEMORY

TABLE VI-continued

```
  7-9 XMIT 3,RRW                   TURN OFF WRITE
8. COMPOSE 'XEC O (IV FIELD 3-7' INSTRUCTION TO READ THE
LOWER 5 BITS (3-7) OF BYTE IV-L1.
  8-1 XMIT 320H, AUX
  8-2 ADD R3,R3                    UPPER 8 BITS OF XEC IN R3
  8-3 XMIT 240H,R4                 LOWER 8 BITS OF XEC IN R4
9. STEPS 4-7 ABOVE TO PERFORM XEC INSTRUCTION.
10. SAVE THE LOWER 5 BITS OF IV-L1 IN WORKING
STORAGE (PARAM1).
  10-1 XMIT XEXADRL, IVL
  10-2 MOVE DMYL37,AUX             LOWER 5 BITS EXADRL = IV FIELD 3-7
  10-3 XMIT XPARAM1, IVR
  10-4 MOVE AUX,PARAM1             SAVE IN WS
11. COMPOSE 'XEC O(IV FIELD 0-2)' INSTRUCTION TO READ THE
UPPER 3 BITS (0-2) OF BYTE IV-L1.
  11-1 XMIT -5,AUX
  11-2 ADD R3,R3                   UPPER 8 BITS OF XEC IN R3
      XMIT 140H,R4                 LOWER 8 BITS OF XEC IN R4
12. STEPS 4-7 ABOVE TO PERFORM XEC INSTRUCTION.
13. APPEND THE UPPER 3 BITS OF BYTE IV-L1 TO THE LOWER
5 BITS IN WORKING STORAGE SAVED IN STEP 10 ABOVE.
  13-1 XMIT XEXADRL,IVL
  13-2 MOVE DMYL57,AUX
  13-3 MOVE AUX(3),AUX             UPPER 3 BITS POSITIONED IN 0-2
  13-4 XMIT XPARAM1,IVR
  13-5 ADD PARAM1,PARAM1           SAVE IN WS
14. DISPLAY THE IV-L1 CONTENTS SAVED IN WORKING STORAGE.
15. Compose 'JMP (CNTXTM,N)'
RESTORE PC FROM WORKING STORAGE (CNTXTM,N) SAVED IN
STEP 2 ABOVE.
  15-1 XMIT 340H,AUX               UPPER 8 BITS OF JMP 0 INSTRUCTION
  15-2 XMIT XCNTXTM, IVR           SELECT UPPER 5 BITS OF SAVED PC
  15-3 ADD CNTXTM,R3
  15-4 XMIT XCNTXTN, IVR           SELECT LOWER 8 BITS OF SAVED PC
  15-5 MOVE CNTXTN,R4              JMP PC IN R3 AND R4
16. STEPS 4-7 ABOVE TO PERFORM JMP INSTRUCTION.
17. ENABLE BREAKPOINT STOP AND START OM INTERPRETER.
  17-1 XMIT XBPSTOP,IVL
  17-2 XMIT 1,BPSTOP               1=HALT AT BREAKPOINT
  17-3 XMIT XHALT,IVL
  17-4 XMIT O,HALT                 0=RUN
18. DETECT HALT AT BREAKPOINT
  18-1 XMIT XSYNC,IVL              SELECT BREAKPOINT SIGNAL
  18-2 MOVE SYNC,AUX               1=AT BREAKPOINT
  18-3 XMIT XBPSTOP,IVL
  18-4 AND BPSTOP,AUX              1=BPSTOP ENABLED
  18-5 NZT AUX,STEP19              JUMP IF SYNC AND BPSTOP = 1
  18-6 JMP STEP 18-1
19. STEPS 1 AND 2 ABOVE TO HALT OM INTERPRETER AND
SAVE PC.
20. STEP 3-14 ABOVE TO RETRIEVE AND DISPLAY THE CONTENTS OF
BYTE IV-L1 AGAIN.
```

The overall operation of the TABLE VI program is described in the following manner. First, the supervisor machine halts the object machine at instruction I3. After halting the object machine, the supervisor machine is instructed by keyboard entry to retrieve the contents of the status byte IV-L1 which is in buffer store 8-L1 of FIG. 5. Thereafter, a breakpoint address is set by keyboard entry to cause the object machine to stop at instruction I8 (which is the same as instruction I2). The supervisor machine then instructs the object machine to retrieve again the floppy disc stutus byte 8-L1.

The notation within the TABLE VI program uses the following conventions. Prefixing a variable name such as HALT with X to form XHALT denotes the address of the store containing that variable. For example, the HALT variable, as indicated in CHART I above, is stored in buffer store 012 of FIG. 2 and hence, the term XHALT denotes the address 012. In TABLE VI, a number with an H suffix is an octal number. Hence the address 012 of the buffer store is 012H. The variable name form DMYLXY, such as DMYL01, denotes a dummy left bank buffer store field running from the bit X through the bit Y.

In TABLE VI, the instruction 1-1 causes the buffer store 012, which stores the HALT command in bit 0, to be addressed. In instruction 1-2, bit 0 of the buffer store 012 is set to 1. When the 1 is set, the IHALT line from store 012 enables synchronizing circuit 95 in FIG. 2 which at the appropriate times generates a 1 which is propogated through gate 93 to generate the OMHLT signal. The OMHLT signal is input to the sequencer 30 of FIG. 3, stops the clock signals and thus halt operation of the object machine.

In the second set of instructions of TABLE VI, the contents of the operating machine program counter are stored in the working store 9' of FIG. 1.

In instruction 2-1, the supervisor machine buffer store which contains the upper 5 bits of the EXADR information is addressed. In FIG. 2, that buffer store is buffer store is buffer store 016.

In instruction 2-2, the contents of buffer store 016 are moved to the R-6 working register of the supervisor machine interpreter. The working registers within the supervisor machine are like the working registers 12 within the object machine interpreter of FIG. 3.

In instruction 2-3, a location in working store 9' is selected for storing the upper 5 bits of the object machine program count. That location, generally designated by XCNTXTM, is any available location in working store 9'.

In instruction 2-4, the upper 5 bits of the object machine program counter are transferred from supervisor working register R-6 to the working store location CNTXTM.

In instruction 2-5, the supervisor machine addresses the supervisor machine buffer store which contains the lower 8 bits of the object machine program count. In FIG. 2, that buffer store is buffer store 017.

In instruction 2-6, another available location, XCNTXTN, within the working store 9' is selected.

In instruction 2-7, the lower 8 bits from the buffer store 017 are transferred to the working store 9' location CNTXTN.

Before commencement of the third set of instructions of TABLE VI, an operator enters through the keyboard 103 in FIG. 2 the address of an object machine buffer store which the operator desires to examine. By way of example, that buffer store is the status byte IV-L1 for the floppy disc of FIG. 5. The object machine address of the IV-L1 buffer store is placed in the working store 9' location specifically set aside for such interrogation. That location is identified as the CNTXTS location. In a similar manner, a designation of whether or not location CNTXTS is in the right or left bank of the object machine is stored in the CNTXTT location of working store 9'.

Transfer of the address of the buffer store from the keyboard to the working store is done in a routine manner not shown in TABLE VI.

The function of the third set of instructions is to compose an instruction in the supervisor machine which will be transmitted to the object machine to cause the object machine to transmit the IV-L1 status byte to the supervisor machine.

In TABLE VI, the instruction 3-1 addresses the location in working store 9' of FIG. 1 which contains the address of the status byte IV-L1 in FIG. 5.

In instruction 3-2, the 8-bit, binary buffer store address of the status byte IV-L1 is transferred to the supervisor machine working register R-2.

In instruction 3-3, the location in the working store 9' which contains the left or right bank designation of the status byte is addressed. In the present example, the designation is for a left bank.

In instruction 3-4, the contents of the location addressed in instruction 3-3 are transferred from working store 9' to the R-6 working register of the supervisor machine. Since the left bank is the one employed in the object machine for IV-L1, the contents of R-6 are eight binary 0's. If a right bank were designated for IV-L1, then the binary designation would be 00000001.

In instruction 3-4, the binary digits corresponding to the octal numbers 307 are stored in the 8-bit auxiliary register of the supervisor machine. The octal numbers 307 translate to 011000111 binary where the leading zero is truncated.

In instruction 3-6, the contents of register R-6 are rotated 5 bits and are added to the contents of the auxiliary register with the results placed in register R-3. The results are binary 11000111. The three leading bits 110 are the binary representation for the XMIT instruction and the 00111 field represents 07 which is the address IVL which enables addressing of a left bank buffer store.

In instruction 3-7, the contents of the R-2 working register are transferred to the R-4 working register.

At the end of the third set of instructions, the XMIT instruction to be performed by the object machine has been composed and is stored in the R-3 and R-4 working registers of the supervisor machine.

In the fourth set of instructions, the program counter count for the object machine, which is stored in the supervisor machine buffer stores 016 and 017 is transferred to the buffer stores 014 and 015. The transfer is made by way of the working registers R-5 and R-6 with appropriate shifting of data for proper field alignment. Referring to CHART I above, the EXADR address in stores 016 and 017 becomes the RADR address in buffer stores 014 and 015 with the proper field alignment. The transfer is complete after instruction 4-10.

In the instruction 4-11, the buffer store 015 which was addressed in instruction 4-9 remains addressed and the bit RWR is switched to a 1 so that the mode M2 of the above CHART II is entered. In mode M2, the RADR address from stores 014 and 015 is selected to address the random access memory 24 of FIG. 1. The contents of the addressed location appear on the RDATA bus 27 which connects as an input to the buffer stores 022 and 023.

In instruction 4-12, the RWR bit is returned to 0 so that mode M4 of CHART II is again resumed.

In the fifth set of instructions, the contents of the buffer stores 022 and 023 are moved to the working store 9' at the address specified by the instructions 5-1 and 5-6. The instruction in the supervisor machine working registers R-3 and R-4 is transferred into the buffer stores 022 and 023. The transfers into registers R-3 and R-4 are completed in instructions 5-4 and 5-8, respectively.

In instructions 5-9 and 5-10, the mode M1 in the above-identified CHART II is entered by setting the RRD bit to 1. During mode M1, the contents of buffer stores 022 and 023 are stored into the random access memory 24 of FIG. 1.

In instruction 5-11, the bit RRD is set to 0 returning to the memory mode M4.

At this point, the instruction composed in the third set of instructions by the supervisor machine has been stored in the random access memory at the location specified by the program counter of the object machine interpreter. In the sixth of instructions, the object machine is enabled for one instruction cycle. During that cycle, the object machine executes the supervisor composed instruction.

In instruction 6-1, the buffer store 012 is addressed. In instruction 6-2, the INHALT bit in buffer store 012 is switched to 0 and after one cycle is switched back to 1 in instruction 6-3. During those supervisor machine instructions, the synchronization circuit 95 in FIG. 2 allows the object machine to complete one cycle and thus execute the supervisor-composed instruction accessed from the random access memory.

In the seventh set of instructions, the original object machine instruction, the one stored in the working store during the fifth set of instructions, is returned to the random access memory in its original location.

In the eigth set of instructions, another instruction is composed in the supervisor machine for execution by the object machine. An XEC instruction is composed and stored in working registers R-3 and R-4 of the supervisor machine.

In the ninth set of instructions, the fourth through seventh sets of instructions are repeated to cause the object machine to execute the supervisor-composed instruction. In executing the XEC instruction, bits 3–7 of the IV-L1 status byte are stored in the address latches 20 of the object machine interpreter (shown in FIG. 3). The contents of latches 20 appear in FIG. 2 on the OMRA bus 28, are stored in the register 88, and in turn are stored in the supervisor buffer stores 016 and 017.

The function of the tenth set of instructions is to transfer the IV bit status bits from buffer store 016 to any convenient location in working storage which is designated PARAM1. The information is moved from buffer store 016 through the supervisor machine auxiliary register (analogous to object machine register 18 of FIG. 3).

The function of the eleventh set of instructions is to compose a new instruction for the object machine. The instruction, XEC, functions to read the upper three bits, IV field 0-2, of the status byte IV-L1.

The 12th set of instructions is a repeat of the fourth through seventh sets of instructions in order to execute the XEC instruction composed in the 11th set of instructions. After completion of the 12th set of instructions, the upper 3 bits of the IV-L1 byte are stored in the EXADR buffer store 016.

The 13th set of instructions transfers the 3bits of status byte from buffer store 016 and appends them to the lower 5 bits previously stored in the PARAM1 location of working storage in the tenth set of instructions above.

A 14th set of instructions is employed to display the status type IV-L1. The instructions for displaying this information are not specifically shown since they are routine. the PARAM1 location is first addressed in the working store. Thereafter, the supervisor machine left bank buffer store 002 is addressed. Then, the contents of the PARAM1 location are moved to buffer store 022 and the display displays the IV status byte in buffer store 002.

The 15th set of instructions function to compose the instruction "JMP contents of CNTXTM,N" for restoring the program count, stored in the working storage location CNTXTM,N, to the object machine memory.

The 16th set of instructions repeat the fourth through seventh sets of instructions to execute the instruction composed in the 15th set.

Prior to the 17th set of instructions, a user enters a breakpoint address. As an example, the address of instruction I8 of TABLE V above, is described. The object machine address of instruction I8 is entered through the keyboard 103 in FIG. 2 and is then routinely loaded into the buffer stores 012 and 013.

The instructions 17-1 and 17-2 function to set the BPSTOP bit in buffer store 004 to 1 and to set the IHALT bit in buffer store 012 to 0. When IHALT is 0, the object machine commences to run executing to run executing the instructions I3, I4, I5, I6, I7 and I8 in TABLE V above. When the address of instruction I8 appears on the OMRA bus 28 in FIG. 3, comparator 87 of FIG. 2 detects the comparison with the breakpoint address in buffer stores 012 and 013. The output from comparator 87 is the SYNC signal which is stored in buffer store 005 and enables AND gate 92. Since the BPSTOP bit from buffer store 004 is set to 1, a halt signal is passed through OR gate 93 and energizes the OMHLT line. The OMHLT line connects to FIG. 3 and stops the object machine by inhibiting clock signals from sequencer 30.

In the 18th set of instructions, the buffer store 005 is addressed in instruction 18-1.

In instruction 18-2, the contents of the SYNC bit are moved to the auxiliary store of the supervisor machine (corresponding to accumulator 18 in the object machine of FIG. 3).

In instruction 18-3, the buffer store 004 is addressed and in instruction 18-5, the SYNC bit stored in the auxiliary register and the BPSTOP bit from the buffer store 004 are AND'ed. The results of the AND are stored in the auxiliary register.

In instruction 18-5, if the contents of the auxiliary register are not all 0's the instruction jumps to the 19th set of instructions. The contents of the auxiliary register are not all 0's provided the SYNC bit from comparator 87 has been detected as a 1 signifying that the breakpoint address has been reached. If the breakpoint instruction has not been reached, the contents of the auxiliary register will remain all 0's and the processing will proceed to instruction 18-6.

The instruction 18-6 is a jump instruction which returns to instruction 18-1 and the sequence is repeated until the object machine reaches the breakpoint address and the SYNC bit is set. At the time that the SYNC bit is set, instruction 18-5 will cause the instruction stream to jump to the 19th instruction set. The 19th set is a repeat of the first and second sets of instructions which cause the object machine to halt or remain halted.

Finally the sets of instructions three through fourteen are repeated to retrieve and display again the contents of the floppy disc status byte IV-L1.

In FIG. 7, an embodiment of the invention is depicted in which four data processing machines 4 are interconnected in the same manner that the two data processing machines of FIG. 1 are interconnected. Each of the data processing machines of FIG. 7 includes a memory 6, an interpreter 5, and interface vector buffer stores 8. In FIG. 7, the circuits and interconnecting lines are identical to the like-numbered circuits and lines in FIG. 1. In FIG. 7, the data processing machine 4-3 is analogous to the object machine 4 of FIG. 1. In FIG. 7, the data processing machine 4-2 is analogous to the supervisor machine 4' of FIG. 1. The data processing machine 4-4 in FIG. 7 is like the machine 4-3 and is an object machine with respect to the data processing machine 4-2. The data processing 4-2, while performing the function of a supervisor machine with respect to the machines 4-3 and 4-4 performs the function of an object machine with respect to the data processing machine 4-1. The data processing machine 4-1 performs the role of a supervisor machine with the respect to the object machine 4-2.

We claim:

1. A data processing apparatus comprising first and second programmed data processing machines wherein each data processing machine includes, buffer means for storing operands, memory means for storing a program of instructions, interpreter means including means connected to said memory means for sequentially fetching instructions from said memory means, means for executing fetched instructions, and means connected to said buffer means for fetching and storing operands from and to said buffer means in the execution of instructions, and wherein said buffer means includes a plurality of buffer stores wherein each of said buffer stores includes, a plurality of latches for storing input signals for a digital device and for storing output signals for a digital device where said input and output signals are said operands, device bus connection means for connecting a digital device to said latches, interpreter bus connection means for connecting said interpreter means to said latches, device enable means for enabling said device bus connection means to connect information into or out from said latches, interpreter enable means, including an enable latch, for enabling said interpreter bus connection means to connect information into or out from said latches, address detector means connected to said interpreter bus connection means and operative to enable said enable latch in response to a unique address and to disable said enable latch in response to all other addresses, and wherein said data processing apparatus further includes control circuit means responsive to operands from said buffer means of said first data processing machine formed as a result of executing instructions in said first data processing machine for halting and starting said second data processing machine from and means for transferring instructions from said first data processing machine to said second data processing machine for execution in said second data processing machine.

2. The apparatus of claim 1 wherein said interpreter means includes, an instruction register for receiving instructions from said memory means, control means responsive to said instruction register for decoding instructions in said instruction register to control said interpreter means, variable-field length means responsive to said control means for selecting variable-length fields of operands fetched from or stored in said buffer means.

3. The apparatus of claim 2 wherein said variable-field length means includes a length mask responsive to said control means for forcing to predetermined states predetermined fields in fetched or stored operands.

4. The apparatus of claim 1 wherein said interpreter means includes, timing means for producing clock signals which define an instruction cycle with a read portion and a write portion, an instruction register for receiving instructions from said memory means each instruction cycle, variable-field means for selecting variable-fields in operands fetched from or stored in said buffer means, control means responsive to said instruction register for decoding instructions to control said buffer means and said variable-field means, said control means including means for reading operands from said buffer means during the write portion of said instruction cycle and for writing altered operands in said buffer means during said write portion of said instruction cycles.

5. The apparatus of claim 1 wherein said memory means for a first one of said machines is a random access memory.

6. The apparatus of claim 1 wherein said buffer means includes a first plurality of buffer stores connected by a first enable line and includes a second plurality of buffer stores connected by a second enable line and wherein said interpreter means includes means for accessing one of said first plurality of buffer stores to obtain a source operand and to access one of said second plurality of buffer stores to store a destination operand during the execution of one instruction.

7. The apparatus of claim 1 wherein said means for fetching and storing operands includes means for storing variable-field operands in response to variable fields specified by said instructions.

8. The apparatus of claim 1 wherein interpreter means includes, timing means for producing clock cycles to establish instruction cycles for timing said intepreter means.

an instruction register for receiving an instruction from said memory means once each instruction cylce under control of said timing means, control means connected to decode instructions in said instruction register including means for responsively accessing said buffer means within one instruction cycle.

9. The apparatus of claim 8 wherein said timing means includes means for generating a first clock signal for latching an instruction in said instruction register once each clock cycle whereby one instruction cycle equals one clock cycle and whereby said buffer means is accessable for reading and writing operands in one clock cycle.

10. The apparatus of claim 1 including priority circuit means for inhibiting said interpreter enable means whenever said device enable means is enabled for writing information into said latches.

11. The apparatus of claim 1 wherein each of said device bus connection means and said interpreter bus connection means includes tri-state gate means connected to the output of said latches for reading out information from said latches whenever said device enable means or said interpreter enable means is enabled, respectively, for reading out information.

12. The data processing apparatus of claim 1 wherein said memory means includes a plurality of addressable locations each for storing an instruction, and wherein said means for sequentially fetching instruction includes means for sequentially providing memory addresses for sequentially addressing said memory means to access instructions, and wherein said memory means of said second data processing machine includes a random access memory addressable with a current address to access a memory location for reading or writing information from or into said random access memory, and wherein said control circuit means includes mode control means for controlling the reading out from or writing into said random access memory.

13. The data processing apparatus of claim 12 wherein said memory means for said second data processing machine includes selection means for selecting an address from said first data processing machine or from said second data processing machine and wherein said mode control means includes means for selecting said first or said second data processing machine.

14. The data processing apparatus of claim 12 wherein said memory means for said second data processing machine operates in a plurality of modes for transmission of instructions to and from said random access memory and includes means for connecting instructions from said random access memory to said interpreter means in said second data processing machine in a first mode, means for transmitting instructions from said random access memory to said first data processing machine in a second mode, and means for transmitting instructions from said first data processing machine to said random access memory in a third mode, said mode control means including means for selecting the mode of transmission of instructions to and from said random access memory.

15. The data processing apparatus of claim 12 wherein said buffer means of said first data processing machine includes means for storing a breakpoint address, and wherein said control circuit means includes means for comparing said breakpoint address with the current address utilized to address the memory means in said second data processing machine in order to provide a compare signal to indicate when said breakpoint address equals the current address of said second data processing machine.

16. The data processing apparatus of claim 15 including halt means responsive to said compare signal for halting said second data processing machine in response to said compare signal.

17. The data processing apparatus of claim 1 wherein each of said data processing machines includes clock means for providing clock signals for timing the respective data processing machine and wherein said control circuit means includes synchronization circuit means for providing synchronization signals to said second data processing machine in synchronism with the clock signals from said second data processing machine for a duration controlled by said first data processing machine.

* * * * *